US007510601B2

(12) United States Patent
Whitley et al.

(10) Patent No.: US 7,510,601 B2
(45) Date of Patent: Mar. 31, 2009

(54) PORTABLE MEDICAL OXYGEN CONCENTRATOR

(75) Inventors: Roger Dean Whitley, Allentown, PA (US); Glenn Paul Wagner, Fogelsville, PA (US); Matthew James LaBuda, Fogelsville, PA (US); David R. Schiff, Highland Park, NJ (US); Peter D. Byar, Willingboro, NJ (US); Andrew M. Weiman, Langhorne, PA (US); Seth GaleWyrick, Philadelphia, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 401 days.

(21) Appl. No.: 11/312,180

(22) Filed: Dec. 20, 2005

(65) Prior Publication Data

US 2007/0137487 A1    Jun. 21, 2007

(51) Int. Cl.
*B01D 53/047* (2006.01)
(52) U.S. Cl. .............. 96/121; 96/124; 128/204.18; 128/205.24
(58) Field of Classification Search ................ 96/121, 96/125, 151; 95/96, 130; 128/204.18, 204.26, 128/205.12, 205.24; 55/502, 505, 506
See application file for complete search history.

(56) References Cited

U.S. PATENT DOCUMENTS

| 4,302,224 | A | * | 11/1981 | McCombs et al. ............. 96/109 |
|---|---|---|---|---|
| 4,511,377 | A | * | 4/1985 | McCombs .................... 96/143 |
| 4,826,510 | A | | 5/1989 | McCombs |
| 4,925,464 | A | * | 5/1990 | Rabenau et al. ............... 96/124 |
| 5,114,441 | A | | 5/1992 | Kanner et al. |
| 5,531,807 | A | * | 7/1996 | McCombs ..................... 95/26 |
| 5,730,778 | A | * | 3/1998 | Hill et al. ..................... 95/12 |
| 5,827,358 | A | | 10/1998 | Kulish et al. |
| 6,068,680 | A | * | 5/2000 | Kulish et al. .................. 95/98 |
| 6,144,945 | A | * | 11/2000 | Garg et al. ..................... 705/28 |
| 6,514,319 | B2 | | 2/2003 | Keefer et al. |
| 6,520,176 | B1 | | 2/2003 | Dubois et al. |

(Continued)

FOREIGN PATENT DOCUMENTS

WO    WO 2005/077824 A1    8/2005

(Continued)

OTHER PUBLICATIONS

SEQUAL The Smart Choice, Advantage: eclipse. P/N 5600 Revision Oct. 2005, San Diego, CA USA.

*Primary Examiner*—Frank M Lawrence
(74) *Attorney, Agent, or Firm*—John M. Fernbacher

(57) ABSTRACT

Portable medical oxygen concentrator comprising an air separation system adapted to recover oxygen from air; a bottom platform and a shell having an outer wall, wherein the shell is detachably connected to the bottom platform, wherein the shell and bottom platform define an enclosed volume when the shell is connected to the bottom platform, and wherein the air separation system is disposed in the enclosed volume; and one or more rechargeable batteries detachably connected to the outer wall of the shell and adapted to provide power to drive the air separation system. The air separation system may comprises a pressure swing adsorption system having two or more adsorbent columns and a rotary valve for directing gas flow sequentially to, from, and among the columns. A base assembly attached to the bottom platform may be adapted to support the two or more adsorbent columns and the rotary valve.

41 Claims, 12 Drawing Sheets

U.S. PATENT DOCUMENTS

| | | | |
|---|---|---|---|
| 6,629,525 | B2 | 10/2003 | Hill et al. |
| 6,651,658 | B1 | 11/2003 | Hill et al. |
| 6,691,702 | B2 | 2/2004 | Appel et al. |
| 6,764,534 | B2 | 7/2004 | McCombs et al. |
| 6,908,503 | B2 * | 6/2005 | McCombs et al. ............ 96/130 |
| 2002/0121191 | A1 * | 9/2002 | Warren .......................... 95/11 |
| 2005/0072298 | A1 | 4/2005 | Deane et al. |
| 2005/0072306 | A1 | 4/2005 | Deane et al. |
| 2005/0072423 | A1 | 4/2005 | Deane et al. |
| 2005/0072426 | A1 | 4/2005 | Deane et al. |
| 2005/0103341 | A1 | 5/2005 | Deane et al. |
| 2006/0230931 | A1 * | 10/2006 | Bliss et al. .................... 95/130 |

FOREIGN PATENT DOCUMENTS

| | | |
|---|---|---|
| WO | 2006/044172 A | 4/2006 |
| WO | 2006/108092 A | 10/2006 |

\* cited by examiner

PORTABLE MEDICAL OXYGEN CONCENTRATOR

BACKGROUND OF THE INVENTION

The supply of therapeutic oxygen to patients in homes and other residential settings is an important and growing segment of the health care industry. Oxygen can be supplied to a patient by liquid or compressed oxygen with an appropriate vaporization or pressure regulation system and a gas delivery cannula. Alternatively, oxygen can be supplied by the generation of oxygen using a small onsite air separation device or medical oxygen concentrator located near the patient that delivers the generated oxygen via a cannula.

Respiratory oxygen usage rates typically range up to 3 LPM (liters per minute at 22° C. and 1 atma pressure) for ambulatory patients with relatively low oxygen requirements, up to 5 LPM for patients with more serious respiratory problems and possibly limited mobility, and in certain cases up to 10 LPM for those with the most serious respiratory problems and more limited mobility. A patient initially may require a higher oxygen supply rate during an illness and later may require less oxygen as recovery is achieved. Alternatively, a patient may require increasing oxygen rates as a chronic condition worsens. A conserver may be used to provide oxygen flow only when the patient inhales, thereby reducing the amount of oxygen required by eliminating the supply of oxygen that is wasted when the patient exhales.

Portable medical oxygen concentrators often are preferred over liquid or compressed oxygen supply systems in home and residential settings, and small air separation devices for these applications are being developed by numerous vendors in the home health care field. Patients typically are encouraged to be ambulatory whenever possible to increase the effectiveness of oxygen therapy and improve their overall health. The portability of a medical oxygen concentrator therefore is an important feature allowing the patient to move about easily and comfortably. In order to maximize portability and ease of use, the medical oxygen concentrator must be designed to have minimum weight and compact dimensions. Patient ambulation time can be maximized by the use of a conserver.

There is a need in the home health care field for an improved, lightweight, battery-powered portable oxygen concentrator for delivering oxygen product to ambulatory patients. These patients typically require a concentrator that can generate up to about 3 LPM of oxygen on a continuous basis and that includes a built-in conserver that maximizes ambulation time. This need is addressed by the embodiments of the invention described below and defined by the claims that follow.

BRIEF SUMMARY OF THE INVENTION

One embodiment of the invention relates to a portable medical oxygen concentrator comprising an air separation system adapted to recover oxygen from air; a bottom platform and a shell having an outer wall, wherein the shell is detachably connected to the bottom platform, wherein the shell and bottom platform define an enclosed volume when the shell is connected to the bottom platform, and wherein the air separation system is disposed in the enclosed volume; and one or more rechargeable batteries detachably connected to the outer wall of the shell and adapted to provide power to drive the air separation system.

The air separation system may comprise
(1) two or more adsorbent columns, each column including a feed end, a product end, and adsorbent material for effecting gas separation by selective adsorption;
(2) a pump assembly comprising a feed pump having a compressed air outlet and a vacuum pump having a gas inlet;
(3) an oxygen product outlet;
(4) a rotary valve having a first plurality of ports adapted to place the compressed air outlet of the feed pump in flow communication sequentially with the feed end of each adsorbent column and to place the gas inlet of the vacuum pump in flow communication sequentially with the feed end of each adsorbent column and having a second plurality of ports adapted to place the oxygen product outlet in flow communication sequentially with the product end of each adsorbent column and to place the product end of each adsorbent column in flow communication sequentially with the product end of another adsorbent column; and
(5) a base assembly attached to the bottom platform and adapted to support the two or more adsorbent columns and the rotary valve.

The feed pump and the vacuum pump may be scroll-type compressors, each being driven by a common drive motor, and the drive motor may be disposed coaxially between the feed pump and the vacuum pump.

The shell has a bottom end adjacent the bottom platform and an upper end opposite the bottom end, and the enclosed volume may include a dividing wall disposed between the base assembly and the pump assembly, wherein the dividing wall extends upward from the bottom platform to a point intermediate the bottom platform and the upper end of the shell.

Another embodiment of the invention includes a portable medical oxygen concentrator comprising
(a) an air separation system adapted to recover oxygen from air that includes
(1) two or more adsorbent columns, each column including a feed end, a product end, and adsorbent material for effecting gas separation by selective adsorption;
(2) a pump assembly comprising a feed pump having a compressed air outlet and a vacuum pump having a gas inlet;
(3) an oxygen product outlet;
(4) a rotary valve having a first plurality of ports adapted to place the compressed air outlet of the feed pump in flow communication sequentially with the feed end of each adsorbent column and to place the gas inlet of the vacuum pump in flow communication sequentially with the feed end of each adsorbent column and having a second plurality of ports adapted to place the oxygen product outlet in flow communication sequentially with the product end of each adsorbent column and to place the product end of each adsorbent column in flow communication sequentially with the product end of another adsorbent column; and
(5) a base assembly adapted to support the two or more adsorbent columns and the rotary valve; and
(b) a bottom platform and a shell having an outer wall, wherein the base assembly and the pump assembly are mounted on the bottom platform, wherein the shell is detachably connected to the bottom platform, and wherein the air separation system is disposed in an enclosed volume formed by the shell and bottom platform when the shell is connected to the bottom platform.

One or more rechargeable batteries may be detachably connected to the outer wall of the shell and adapted to provide power to drive the feed pump and the vacuum pump. A control system and a conserver may be included, wherein the rechargeable batteries are adapted to provide power to the control system and conserver.

The bottom platform defines a planar surface and the concentrator is adapted to operate when the planar surface is oriented horizontally or at any angle from a horizontal plane. The shell typically has an inlet grille, an outlet grille, and a fan disposed in the enclosed volume and adapted to draw ambient air into the enclosed volume and discharge heated air from the enclosed volume. A cooling coil may be attached to the compressed air outlet of the feed pump and adapted to cool hot compressed air from the feed pump, wherein the fan is adapted to pass ambient air over the cooling coil and the feed pump. The shell has a bottom end adjacent the bottom platform and an upper end opposite the bottom end, and the enclosed volume may include a dividing wall disposed between the base assembly and the pump assembly, wherein the dividing wall extends upward from the bottom platform to a point intermediate the bottom platform and the upper end of the shell.

An alternative embodiment of the invention relates to an adsorptive gas separation system comprising (a) two or more cylindrical columns, wherein each column includes a feed end, a feed inlet at the feed end, a product end, and a product outlet at the product end, and wherein at least two of the cylindrical columns are adsorbent columns containing adsorbent material for effecting gas separation by selective adsorption;

(b) a pump assembly comprising a feed pump having a compressed gas outlet and a vacuum pump having a gas inlet;

(c) a product gas outlet;

(d) a rotary valve having a first plurality of ports adapted to place the compressed gas outlet of the feed pump in flow communication sequentially with the feed end of each adsorbent column and to place the gas inlet of the vacuum pump in flow communication sequentially with the feed end of each adsorbent column and having a second plurality of ports adapted to place the product gas outlet in flow communication sequentially with the product end of each adsorbent column and to place the product end of each adsorbent column in flow communication sequentially with the product end of another adsorbent column;

(e) a base assembly upon which the adsorbent columns and the rotary valve are mounted; and (f) a support platform upon which the base assembly and the pump assembly are mounted.

The system optionally includes a product gas storage tank in flow communication with the product gas outlet and in sequential flow communication with the product outlet at the product end of each adsorbent column. The product gas storage tank may be one of the two or more cylindrical columns containing none of the adsorbent material and mounted on the base assembly. Alternatively, the product gas storage tank may contain a different adsorbent material than the adsorbent material in the adsorbent columns, wherein the different adsorbent material is adapted to increase the effective product tank storage capacity.

The base assembly typically is fabricated as a molded platform comprising a bottom member having a first surface and a second surface generally parallel to the first surface, two or more cylindrical collars attached to the first surface of the bottom member and adapted to detachably receive and support the respective product ends of the two or more cylindrical adsorbent columns, and a ported stator plate attached to the first surface of the bottom member, and wherein the ported stator plate is part of the rotary valve and includes the second plurality of ports adapted to place the product gas outlet in flow communication sequentially with the product end of each adsorbent column and to place the product end of each adsorbent column in flow communication sequentially with the product end of another adsorbent column.

The ported stator plate may have a central stator port and two or more peripheral stator ports adjacent the first surface of the bottom member; wherein a column product port is disposed in the bottom member of the molded platform within each of the two or more cylindrical collars, each column product port extending from the first surface of the bottom member to a point intermediate the first surface and the second surface of the bottom member; wherein each column product port and each cylindrical adsorbent column is adapted such that the product outlet of a cylindrical adsorbent column can be sealably and removably connected to a column product port; and wherein each peripheral stator port is connected to a respective column product port by a passage disposed in the bottom member of the base assembly.

The cylindrical adsorbent columns and/or the base assembly may comprise plastic or polymeric material. The bottom member and the two or more cylindrical collars may be formed from a single piece of molded polymeric or plastic material.

The adsorptive gas separation system optionally includes a product gas storage tank in flow communication with the product gas outlet and in flow communication via the central stator port with the product outlet at the product end of each adsorbent column, wherein the product gas storage tank is one of the two or more cylindrical columns, contains none of the adsorbent material, and is detachably supported in one of the cylindrical collars on the base assembly; wherein the feed inlet of the product gas storage tank is adapted to be sealably and removably connected to a column product port disposed in the bottom member of the molded platform within the cylindrical collar; and wherein the column product port is connected to the central stator port by a passage disposed in the bottom member of the base assembly.

Another alternative embodiment of the invention relates to a base assembly for an adsorptive gas separation system comprising a molded platform comprising a bottom member having a first surface and a second surface generally parallel to the first surface; two or more cylindrical collars attached to the first surface of the bottom member and adapted to detachably receive and support respective ends of two or more cylindrical columns; and a ported stator plate attached to the first surface of the bottom member, wherein the ported stator plate is part of a rotary valve adapted to direct gas flow in the operation of the adsorptive gas separation system, and wherein the ported stator plate has a central stator port and two or more peripheral stator ports adjacent the first surface of the bottom member. A column product port is disposed in the bottom member of the molded platform within each of the two or more cylindrical collars, each column product port extends from the first surface of the bottom member to a point intermediate the first surface and the second surface of the bottom member, each column product port is adapted to be sealably and removably connected to a cylindrical column, and each peripheral stator port is connected to a respective column product port by a passage disposed in the bottom member of the base assembly.

The base assembly may comprise two or more cylindrical columns, each column having an interior and a tube at one end in flow communication with the interior, wherein the tube has a compliant sealing element disposed around an outer circumference thereof, and wherein the tube with the compliant sealing element is adapted to be sealably and removably inserted into a column product port disposed in the bottom member of the molded platform. The compliant sealing element may be an O-ring disposed in a circumferential groove in an outer surface of the tube, and the O-ring may be sized such that the tube and O-ring can be sealably and removably inserted into a column product port.

Each column may be adapted to be locked into a cylindrical collar while the tube and O-ring are sealably inserted into the column product port of the cylindrical collar and may be adapted to be unlocked from the cylindrical collar while the tube and O-ring are removed from the column product port.

At least two of the two or more cylindrical columns may be adsorbent columns containing adsorbent material for effecting gas separation by selective adsorption. At least one of the two or more cylindrical columns may be adapted to be used as a product gas storage tank. The product gas storage tank may contain an adsorbent material adapted to increase the effective product tank storage capacity.

The bottom member of the base assembly may comprise (1) a first sub-member including the first surface, the two or more cylindrical collars attached to the first surface, a first intermediate surface generally parallel with the first surface, and open channels that form portions of the passages connecting each peripheral stator port to a respective column product port; and (2) a second sub-member including the second surface and a second intermediate surface generally parallel with the second surface. The first and second intermediate surfaces may be joined such that the first open channels in the first sub-member are covered by the second intermediate surface, thereby forming the passages disposed in the bottom member of the base assembly that connect each peripheral stator port to a respective column product port.

The bottom member alternatively may comprise (1) a first sub-member including the first surface, the two or more cylindrical collars attached to the first surface, a first intermediate surface generally parallel with the first surface, and first open channels that form first portions of the passages connecting each peripheral stator port to a respective column product port and (2) a second sub-member including the second surface, a second intermediate surface generally parallel with the second surface, and second open channels that form second portions of the passages connecting each peripheral stator port to a respective column product port. The first and second intermediate surfaces may be joined such that the first open channels in the first sub-member are congruent with the second open channels of the second sub-member, thereby forming the passages disposed in the bottom member of the base assembly that connect each peripheral stator port to a respective column product port. Any of the molded platform, the two or more cylindrical collars, and the two or more cylindrical adsorbent columns may comprise plastic or polymeric material.

A related embodiment of the invention relates to a portable medical oxygen concentrator comprising (a) an air separation system adapted to recover oxygen from air that includes
  (1) four or more cylindrical columns, wherein each column includes a feed end, a feed inlet at the feed end, a product end, and a product outlet at the product end, and wherein at least four of the cylindrical columns are adsorbent columns containing adsorbent material for effecting air separation by selective adsorption;
  (2) a pump assembly comprising a feed pump having a compressed air outlet and a vacuum pump having a gas inlet;
  (3) an oxygen product outlet;
  (4) a rotary valve having a first plurality of ports adapted to place the compressed air outlet of the feed pump in flow communication sequentially with the feed end of each adsorbent column and to place the gas inlet of the vacuum pump in flow communication sequentially with the feed end of each adsorbent column, a product gas outlet port, and a second plurality of ports adapted to place the product gas outlet port in flow communication sequentially with the product end of each adsorbent column and to place the product end of each adsorbent column in flow communication sequentially with the product end of another adsorbent column; and
  (5) a base assembly adapted to support the at least four adsorbent columns and the rotary valve;
(b) a bottom platform and a shell having an outer wall, wherein the base assembly and the pump assembly are mounted on the bottom platform, wherein the shell is detachably connected to the bottom platform, and wherein the air separation system is enclosed by the shell and bottom platform when the shell is connected to the bottom platform; and
(c) one or more rechargeable batteries detachably connected to the outer wall of the shell and adapted to provide power to drive the feed pump, the vacuum pump, and the rotary valve.

The portable medical oxygen concentrator optionally includes a product gas storage tank in continuous flow communication with the product gas outlet port and in sequential flow communication with the product outlet at the product end of each adsorbent column. The oxygen concentrator may include a check valve having an inlet and an outlet, piping connecting the product gas outlet port with the inlet of the check valve, and piping connecting the outlet of the check valve with the product gas storage tank.

The product gas storage tank may be one of the cylindrical columns, wherein the product gas storage tank is mounted on the base assembly. The product gas storage tank may contain a different adsorbent material than the adsorbent material in the adsorbent columns, wherein the different adsorbent material is adapted to increase the effective product tank storage capacity.

Optionally, the oxygen concentrator includes conserver adapted to deliver oxygen product from the product gas storage tank to the oxygen product outlet, wherein the conserver is adapted to deliver the oxygen during a patient's inhalation period and to deliver no oxygen during the patient's exhalation period.

In one version of this embodiment, the portable medical oxygen concentrator comprises four adsorbent columns and the product gas storage tank, wherein the base assembly supports the four adsorbent columns, the gas storage tank, and the rotary valve. In this version, the base assembly comprises (a) a molded platform comprising a bottom member having a first surface and a second surface generally parallel to the first surface;
(b) five cylindrical collars attached to the first surface of the bottom member and adapted to detachably receive and support respective product ends of the four cylindrical adsorbent columns and the product gas storage tank;
(c) a ported stator plate attached to the first surface of the bottom member and disposed adjacent at least two of the two or more cylindrical collars; wherein the ported stator plate is part of the rotary valve adapted to direct gas flow in the operation of the adsorptive gas separation system; and wherein the ported stator plate has a central stator port and four peripheral stator ports adjacent the first surface of the bottom member.

Within each of the five cylindrical collars there is disposed a column product port in the bottom member of the molded platform, each column product port extending from the first surface of the bottom member to a point intermediate the first surface and the second surface of the bottom member, each column product port adapted to be sealably and removably connected to a product outlet of a cylindrical column; wherein each peripheral stator port is connected to a column product port associated with a respective adsorbent column by a passage disposed in the bottom member of the base assembly; and wherein the central stator port is connected to the column product port associated with the product gas storage tank by a passage disposed in the bottom member of the base assembly.

The bottom member in this version comprises
(1) a first sub-member including the first surface, the five cylindrical collars attached to the first surface, a first intermediate surface generally parallel with the first surface, and first open channels that comprise first portions of the passages connecting each peripheral stator port to a respective column product port and the passage connecting central stator port to the column product port associated with the product gas storage tank; and
(2) a second sub-member including the second surface and a second intermediate surface generally parallel with the second surface;

The first and second intermediate surfaces may be joined such that the first open channels in the first sub-member are covered by the second intermediate surface, thereby forming the passages disposed in the bottom member of the base assembly that connect each peripheral stator port to a respective column product port and the passage that connects the central stator port to the column product port associated with the product gas storage tank.

The five cylindrical collars in this version typically are arranged such that a first collar, a second collar, and a third collar are placed at equidistant locations along a first axis and a fourth collar and a fifth collar are placed on a second axis generally parallel to the first axis, wherein the fourth collar is adjacent the first collar, the fifth collar is adjacent the third collar, the ported stator plate is adjacent the second collar and is on the second axis between the fourth collar and the fifth collar. The cylindrical column that serves as the product gas storage tank is mounted in the second collar and the cylindrical columns that contain the adsorbent material are mounted in the first, third, fourth and fifth collars. The bottom platform may comprise a generally flat bottom portion having a periphery, an upper surface, and a lower surface, a continuous vertical wall segment having an upper end and a lower end, wherein the lower end is attached to the periphery of the flat bottom portion and the upper end has a horizontal lip attached thereto, wherein the base assembly and the pump assembly are mounted on the upper surface, and wherein the lower surface is adapted to rest on a floor or other external surface.

Figure 1:
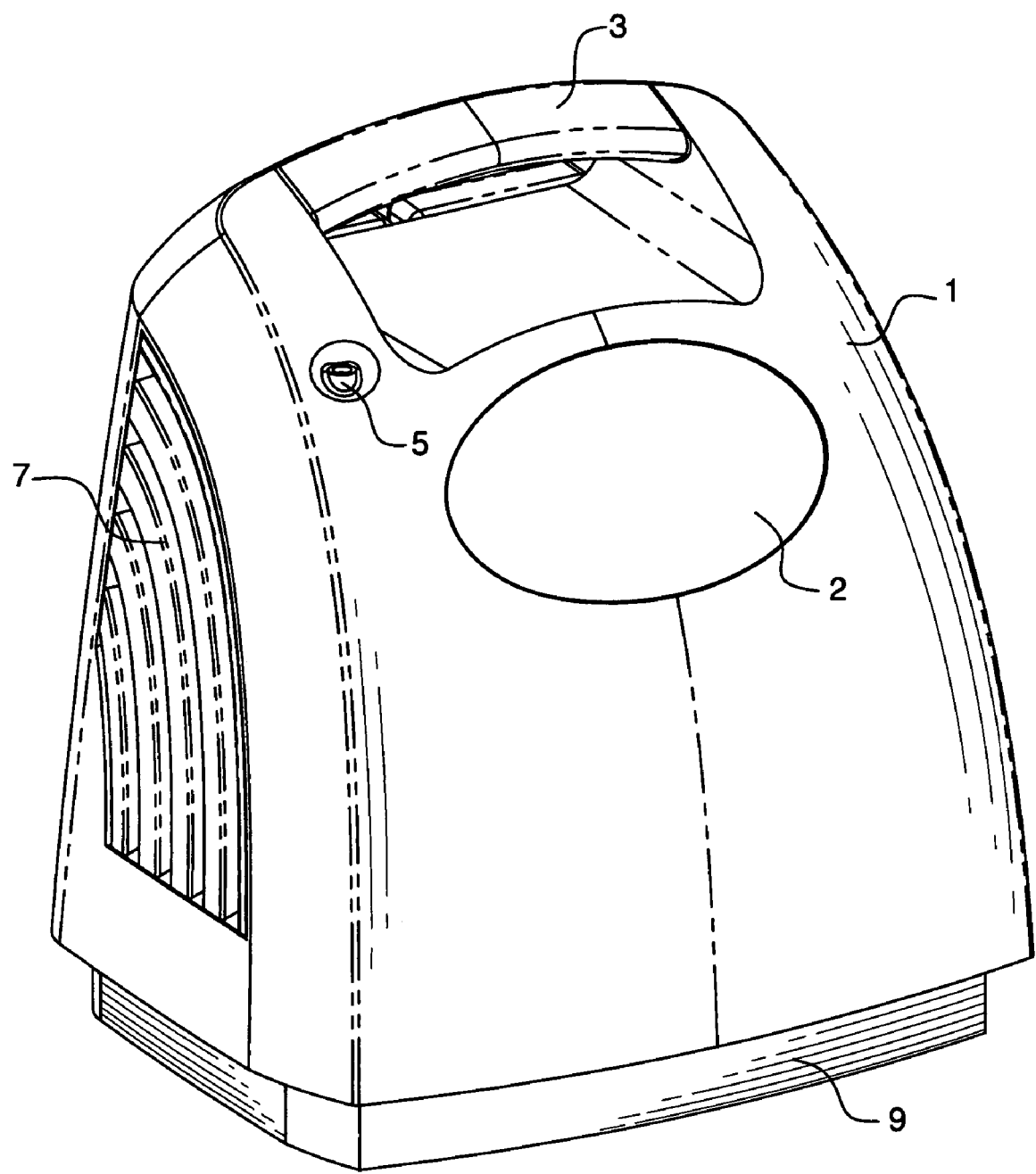
FIG. 1 is a front view of a portable medical oxygen concentrator according to an embodiment of the invention.

The drawings in the Figures listed above are not necessarily to scale.

DETAILED DESCRIPTION OF THE INVENTION

A portable medical oxygen concentrator and methods of operating the concentrator are provided by the various embodiments of the invention described below to generate a product containing greater than 85 vol % oxygen. The concentrator uses an air separation system to recover oxygen from air, and this system may be a pressure swing adsorption unit using a rotary valve to direct gas flow to, from, and between multiple adsorbent columns. The rotary valve and adsorbent columns may be mounted in a compact base assembly, and the columns may be detachably connected to the base assembly at one end to allow easy replacement. Integrated passages may be disposed in the base assembly for the flow of gas among the columns and the rotary valve, thereby eliminating separate piping at the product ends of the columns. The adsorbent columns and base assembly may be fabricated of plastic or polymeric material to minimize weight.

The components of the air separation system are surrounded by an external removable shell and may be cooled by an interior fan that passes external air over the heat-generating components within the shell. Rechargeable batteries to operate the concentrator may be mounted on an external surface of the shell so that the heat generated by battery operation can be dissipated externally, thereby eliminating the associated internal heat load if the batteries were located within the shell.

The generic term "pressure swing adsorption" (PSA) means that the adsorption process operates on the principle of differential adsorption between an upper pressure for adsorption and a lower pressure for desorption, wherein the upper pressure is super-atmospheric and the lower pressure is super-atmospheric, atmospheric, or sub-atmospheric. One version of a PSA process is defined by the term "pressure vacuum swing adsorption" (PVSA) in which the lower pressure is sub-atmospheric.

The term "in flow communication with" as applied to a first and second region means that gas can flow from the first region to the second region through connecting piping or a passage and/or an intermediate region. The term "connected to" as applied to a first and second region means that gas can flow from the first region to the second region through connecting piping or a passage.

The indefinite articles "a" and "an" as used herein mean one or more when applied to any feature in embodiments of the present invention described in the specification and claims. The use of "a" and "an" does not limit the meaning to a single feature unless such a limit is specifically stated. The definite article "the" preceding singular or plural nouns or noun phrases denotes a particular specified feature or particular specified features and may have a singular or plural connotation depending upon the context in which it is used. The adjective "any" means one, some, or all indiscriminately of whatever quantity. The term "and/or" placed between a first entity and a second entity means one of (1) the first entity, (2) the second entity, and (3) the first entity and the second entity.

Figure 2:
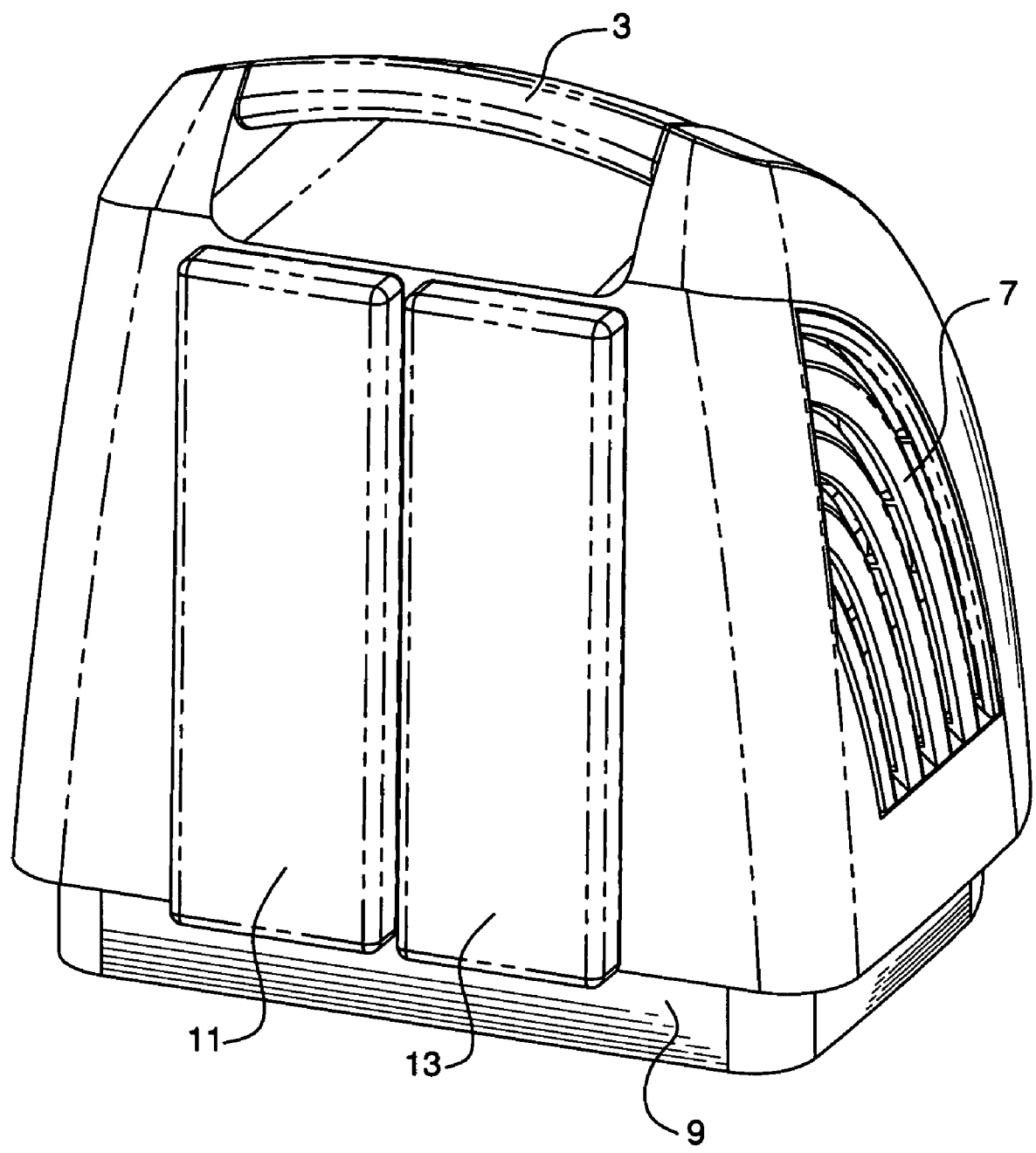
FIG. 2 is a rear view of the portable medical oxygen concentrator of FIG. 1.

One embodiment of the oxygen concentrator is shown in an external front view in FIG. 1. Outer shell 1 includes carrying handle 3, oxygen product outlet 5 for insertion of a cannula to deliver oxygen product to the patient, air inlet grille 7 on one side of the shell, and support base or bottom platform 9 adapted to support the concentrator on a floor or any other surface. Shell 1 may be a single molded piece or may be formed by two or more shell sub-components joined to form the shell. A gas outlet grille (not seen in this view) is located on the other side of the shell. User interface panel 2 provides buttons and/or knobs which the patient can use to turn the unit on and off, switch between continuous product flow and conserver operation, and adjust the flow rate of the product. The interface panel may provide a display of icons and/or lights to indicate operational status and alarms for the concentrator, and also allow user selection of operating mode and product flow rates. A printed circuit board that controls the interface display may be located on the inside of the shell behind interface panel 2. FIG. 2 shows an external rear view of the concentrator with handle 3, air inlet grille 7, and support base 9 as shown in FIG. 1. Two battery packs 11 and 13 (typically containing lithium ion batteries) are detachably connected to the rear external wall of the shell and contain rechargeable batteries that provide power to operate the concentrator. The battery packs are advantageously mounted outside the shell to reduce the generated heat load within the shell as described later.

The concentrator shown in FIGS. 1 and 2, including all internal components described below, typically weighs between about 8 and about 16 lb. In one representative embodiment, the overall dimensions are approximately 13 inches high by 12 inches wide by 8.6 inches deep.

Figure 3:
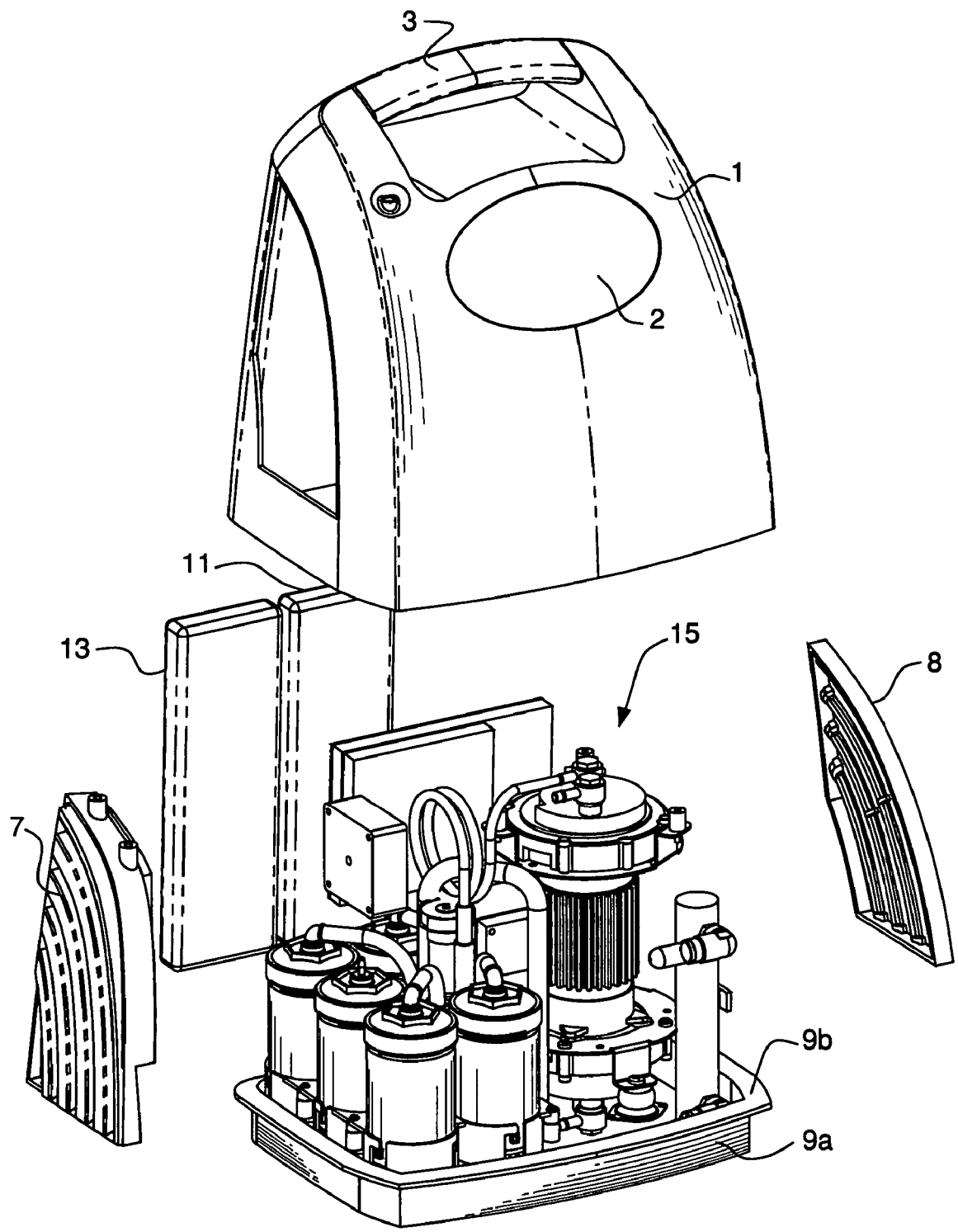
FIG. 3 is an exploded view of the portable medical oxygen concentrator of FIGS. 1 and 2.

An exploded perspective view of the concentrator is given in FIG. 3 showing shell 1, interface panel 2, handle 3, air inlet grille 7, and battery packs 11 and 13 as shown in FIGS. 1 and 2. Also shown in FIG. 3 is outlet grille 8 and components of support base 9, namely, vertical wall segment 9a and horizontal lip 9b. Wall segment 9a is attached to a flat bottom portion (not visible) having a bottom surface adapted to rest on a floor or other external surface. Air separation system 15, which in this embodiment is a pressure swing adsorption system, is mounted on the upper surface of the flat bottom portion of support base 9.

Figure 4:
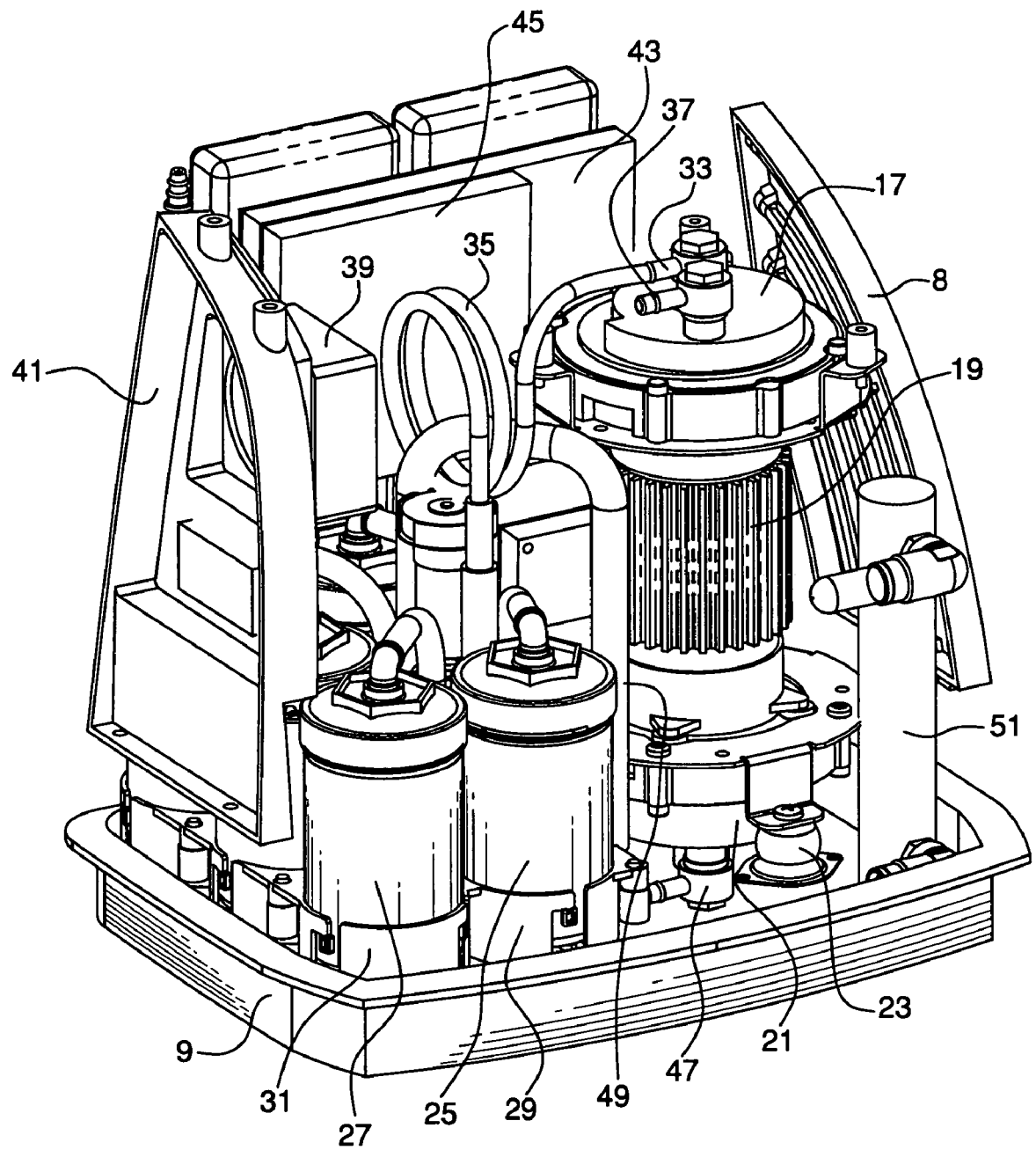
FIG. 4 is a cutaway view of the portable medical oxygen concentrator of FIGS. 1 and 2.

A larger view of the pressure swing adsorption system is shown in FIG. 4 and illustrates the general spatial relationship among some of the system components. Compressed air feed for the pressure swing adsorption system is provided by compressor or feed pump 17, which in this embodiment is a scroll compressor or pump driven by electric motor 19. Vacuum for operation of the pressure swing adsorption system is provided by vacuum compressor or pump 21, which in this embodiment is a scroll compressor or pump, is driven by motor 19, and is located coaxially with the motor and with compressor 17. The integrated pump assembly comprising compressor 17, motor 19, and vacuum pump 21 is attached to the flat bottom portion of support base 9 by a plurality of shock-absorbing flexible mounts, one of which is seen as flexible mount 23. While feed pump 17 and vacuum pump 21 in this embodiment are scroll-type pumps, any type of pump or compressor known in the art may be used.

In the embodiment of FIG. 4, the pressure swing adsorption system uses four adsorbent columns, two of which are seen as adsorbent columns 25 and 27 that are removably mounted in cylindrical collars 29 and 31, respectively, which are part of a base assembly described later. Immediately behind adsorbent column 27 is an empty column having similar dimensions that is utilized for product gas storage as later described. Immediately behind adsorbent column 25 and next to the product gas storage column is the rotary valve that directs gas flow to, from, and between the multiple adsorbent columns. Two additional adsorbent columns (not visible) are located behind the gas storage column and the rotary valve.

The compressed gas outlet 33 of feed pump 17 is connected to cooling coil 35 for removing the heat of compression from the compressed air feed. Air inlet 37 is connected by tubing (not shown) to draw external air from an opening (not shown) inset into support bracket 41, wherein the opening draws ambient air through an open cell foam filter (not shown) behind air inlet grille 7 and then through a finer filter (e.g., felt or HEPA) before the compressor intake.

External air for cooling is drawn in through air inlet grille 7 (not shown here) by fan 39 mounted on support bracket 41, passes over cooling coil 35 and feed pump 17, and exits through outlet grille 8. A thin wall (not shown) may be located between the base assembly and the integrated assembly of compressor 17, motor 19, and vacuum pump 21. The wall may be attached to the support base 9 and extend most or all of the way from front to back of base 9 and upward to at least the top of adsorbent column 25 and the adsorbent column behind the rotary valve. The purpose of the wall is to reduce the flow of warm air from the area around compressor 17, motor 19, and pump 21 which otherwise would flow back to the base assembly and adsorbent columns.

Control modules 43 and 45 contain electronic control systems for AC/DC power conversion, controlling pump speed and rotary valve speed, monitoring product pressure, controlling conserver operation, controlling the display panel and providing system alarms, and managing charging of the batteries. The control modules contain printed circuit boards having a smart charging circuit to control battery charging when the concentrator is operating on external AC power. The charging circuit determines the amount of incoming power and the fraction of the incoming power that is being consumed by the concentrator. Any excess power is used the charge the batteries. The slower the concentrator is running, the more power is used to charge the batteries, which shortens the charging time.

For each product flow rate setting, a look-up table in a controller in control module 43 or 45 sets the pump speed, rotary valve speed, and the flow control valve position. The goal is to maintain a constant operating pressure envelope (i.e., the range of maximum to minimum pressure over the course of the PSA cycle in the adsorbent beds) for the process. An optional feedback control loop may be used to monitor the product tank pressure and adjust the pump and rotary valve speed to maintain a constant average product tank pressure.

Inlet 47 of vacuum pump 21 is connected via vacuum inlet line 49 to the feed stator of the rotary valve (not visible) to withdraw waste gas sequentially from each adsorbent column during the evacuation and purge steps in the adsorption cycle. The discharge of the vacuum pump (not seen here) passes through silencer or muffler 51 and is finally discharged through grille 8.

Figure 5:
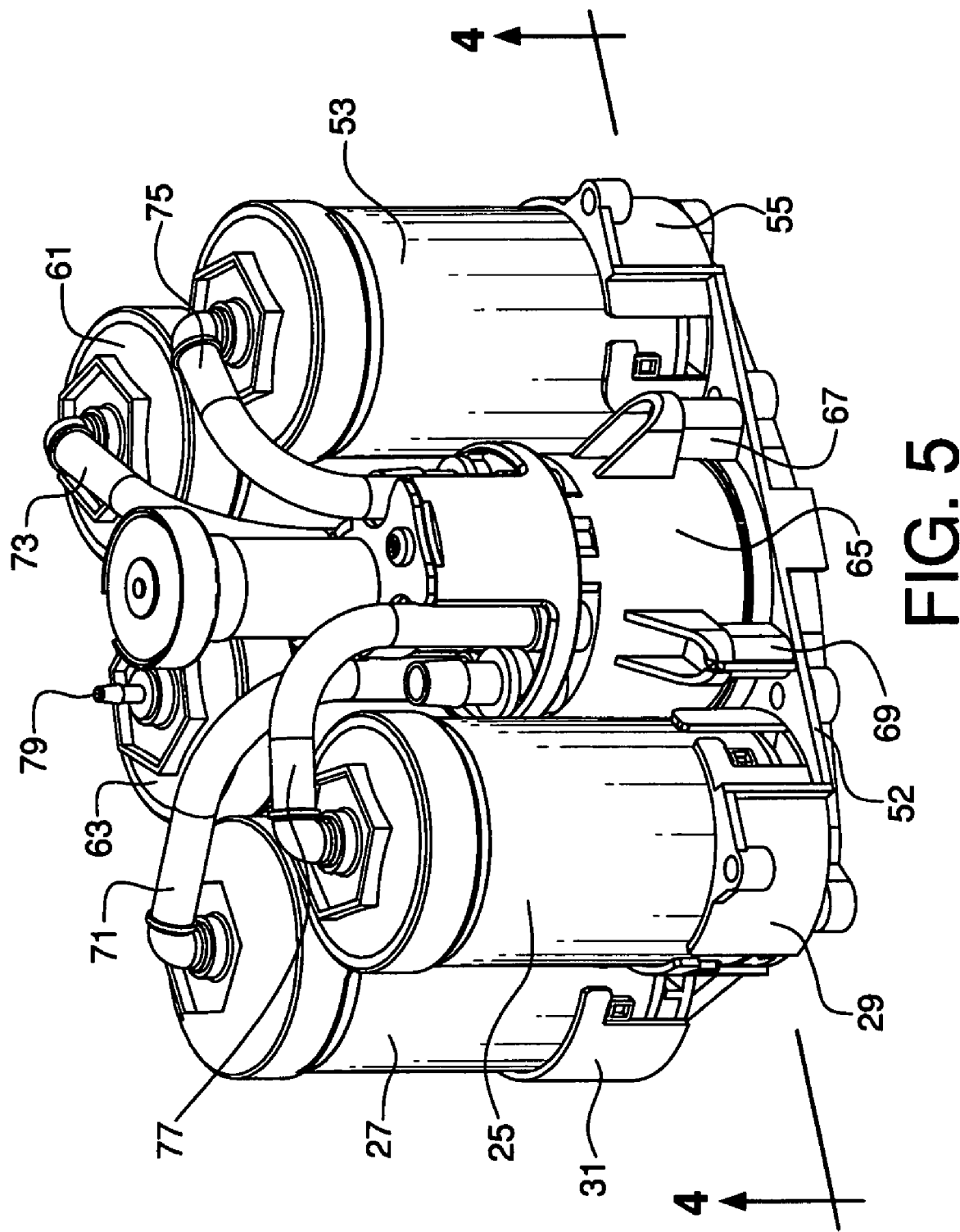
FIG. 5 is a view of the base assembly with attached adsorbent columns, product storage tank, and rotary valve in the portable medical oxygen concentrator of FIGS. 3 and 4.

The base assembly with the adsorbent columns, the gas storage column, and the rotary valve is shown in FIG. 5 after removal from support base 9 of FIG. 4. The base assembly comprises a molded platform having bottom member 52 with a number of attached collars and brackets for mounting the adsorbent columns, the gas storage column, and the rotary valve. The base assembly has six attachment locations oriented symmetrically in two rows of three to form a "six-pack" configuration as shown. Five cylindrical collars are attached to the upper surface of the bottom member and are adapted to detachably receive and support the respective ends of four cylindrical adsorbent columns and one empty column for product gas storage. The rotary valve is located between two of the adsorbent columns and directly adjacent all four of the adsorbent columns.

Adsorbent column 27 is detachably mounted in and detachably connected to collar 31, adsorbent column 25 is detachably mounted in and detachably connected to collar 29, adsorbent column 53 is detachably mounted in and detachably connected to collar 55, and adsorbent column 61 is detachably mounted in and detachably connected to a fourth collar (not visible). Column 63, which is used for product gas storage and may be empty (i.e., contains none of the adsorbent for air separation located in the adsorbent columns), is detachably mounted in and detachably connected to a fifth collar (not visible). Optionally, column 63 (the product gas storage tank) may be elongated to increase its volume and/or it may contain a different adsorbent material than the adsorbent material in the adsorbent columns, wherein the different adsorbent material is adapted to increase the effective product tank storage capacity by adsorbing product gas. Rotary valve 65 is mounted to bottom member 52 by four bolted mounts, two of which are seen here as mounts 67 and 69. The feed ends of the adsorbent columns are connected to the feed stator of rotary valve 65 by molded tubes 71, 73, 75, and 77.

Outlet 79 of empty column 63 (the product gas storage column) is connected by a tube (not shown) to the built-in conserver (not shown), from which the product gas is supplied via oxygen product outlet 5 (FIG. 1) to the patient's cannula. A bacterial filter (not shown) may be located between outlet 79 and oxygen product outlet 5. The conserver may be mounted on control modules 43 or 45, or alternatively on the printed circuit board behind interface panel 2. If the conserver is not used, continuous product gas flows from outlet 79 to oxygen product outlet 5. An optional external humidifier (not shown) may be mounted on the concentrator shell wherein the humidifier is adapted to humidify oxygen product gas from outlet 79 and deliver humidified gas to oxygen product outlet 5. Product purity typically is between 85 vol % and 96 vol % oxygen, product gas flow rate is typically in the range of 0.25 to 3.5 LPM, and the delivery pressure is between 5 and 9 psig.

The adsorbent columns contain adsorbent material suitable for preferentially adsorbing nitrogen from air to yield an oxygen product containing at least 85 vol % oxygen. The adsorbent may be any of the commercially-available adsorbents for this service such as, for example, type X zeolite or low silica type X zeolite, wherein at least 80% of the cation sites are exchanged with lithium cations. The inlet end of each adsorbent column may contain one or more layers of different adsorbents for removing the water and carbon dioxide present in ambient air and may be selected from activated alumina and/or sodium type X zeolite or sodium/potassium low silica type X zeolite and/or various cation forms of chabazite. The adsorbent may be densely packed by various methods known in the art, such as snow fall loading and/or vibrated settling to prevent movement after loading. Each of these adsorbents may contain binder or be of a binderless composition, both of which can be manufactured by techniques known in the art. The shape of the adsorbent particles may be spherical, cylindrical, granular, or any structured adsorbent, such as laminates or monoliths.

The adsorbent may be held in place by two flat circular diffusers at the feed and product ends of the adsorbent columns, wherein one of the diffusers is held under pressure by a spring, such as a wave spring. The circular diffuser may have a screen or mesh attached to the side adjacent to the adsorbent in order to prevent adsorbent from leaking through the openings in the diffuser.

Figure 6:
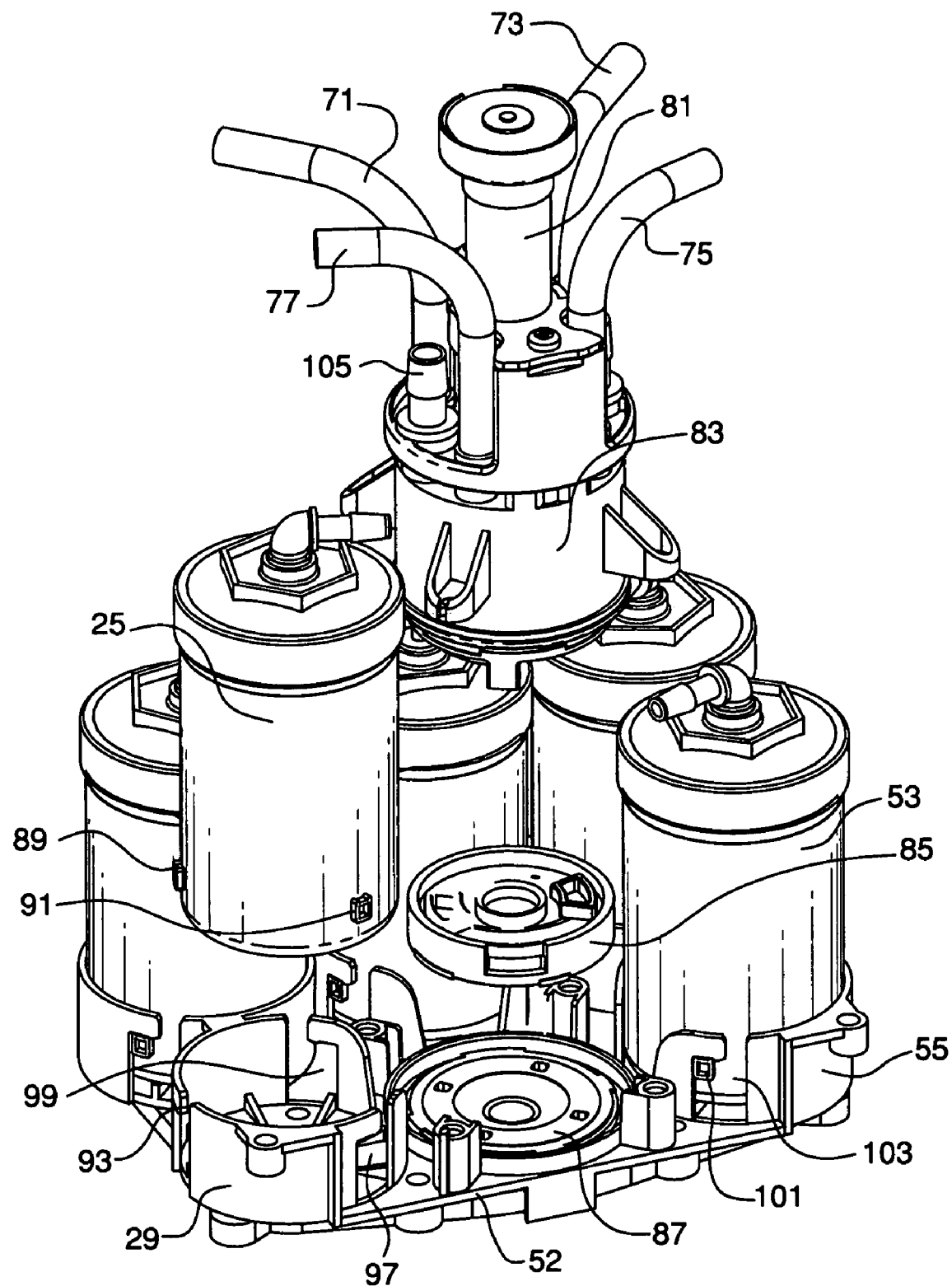
FIG. 6 is a partial exploded view of FIG. 5.

A partially-exploded view of the base assembly is shown in FIG. 6 to illustrate the placement of the adsorbent columns and the rotary valve. Drive motor 81 and outer case 83 of the rotary valve are shown here separated from product rotor 85 and product stator 87, which is mounted directly on bottom member 52. The feed rotor and the feed stator are located within outer case 83. The feed ends of the adsorbent columns are connected to the inlets of the feed stator of the rotary valve by molded tubes 71, 73, 75, and 77. Vacuum outlet 105 connects the feed stator to vacuum pump 21 (FIG. 4) by molded tube 49 (not shown in FIG. 6).

The adsorbent columns and the product gas storage column are detachably mounted in and detachably connected to the collars that are attached to the upper surface of bottom member 52. Each column has a plurality of studs or bosses on the outer surface near the bottom that are adapted to be twisted for engagement and disengagement in notches formed in the sleeves. Adsorbent column 25, for example, has bosses 89 and 91 that snap into retaining notches 93 and 97, respectively, in collar 29. A third boss (not visible) engages and disengages from retaining notch 99 in collar 29. A view of an engaged boss and retaining notch is seen for adsorbent column 53, which is mounted in collar 55 by the engagement of boss 101 into retaining notch 103. Boss 101 can be disengaged from retaining notch 103 by rotating adsorbent column 53 counterclockwise (for example, by approximately 17 degrees) and lifting it vertically. The engagement of boss 101 with retaining notch 103 is effected by reversing these steps. This type of engaging and disengaging locking system is described here for illustration purposes only; other types of locking systems are possible and may be used to detachably mount the columns in the base assembly.

Figure 7:
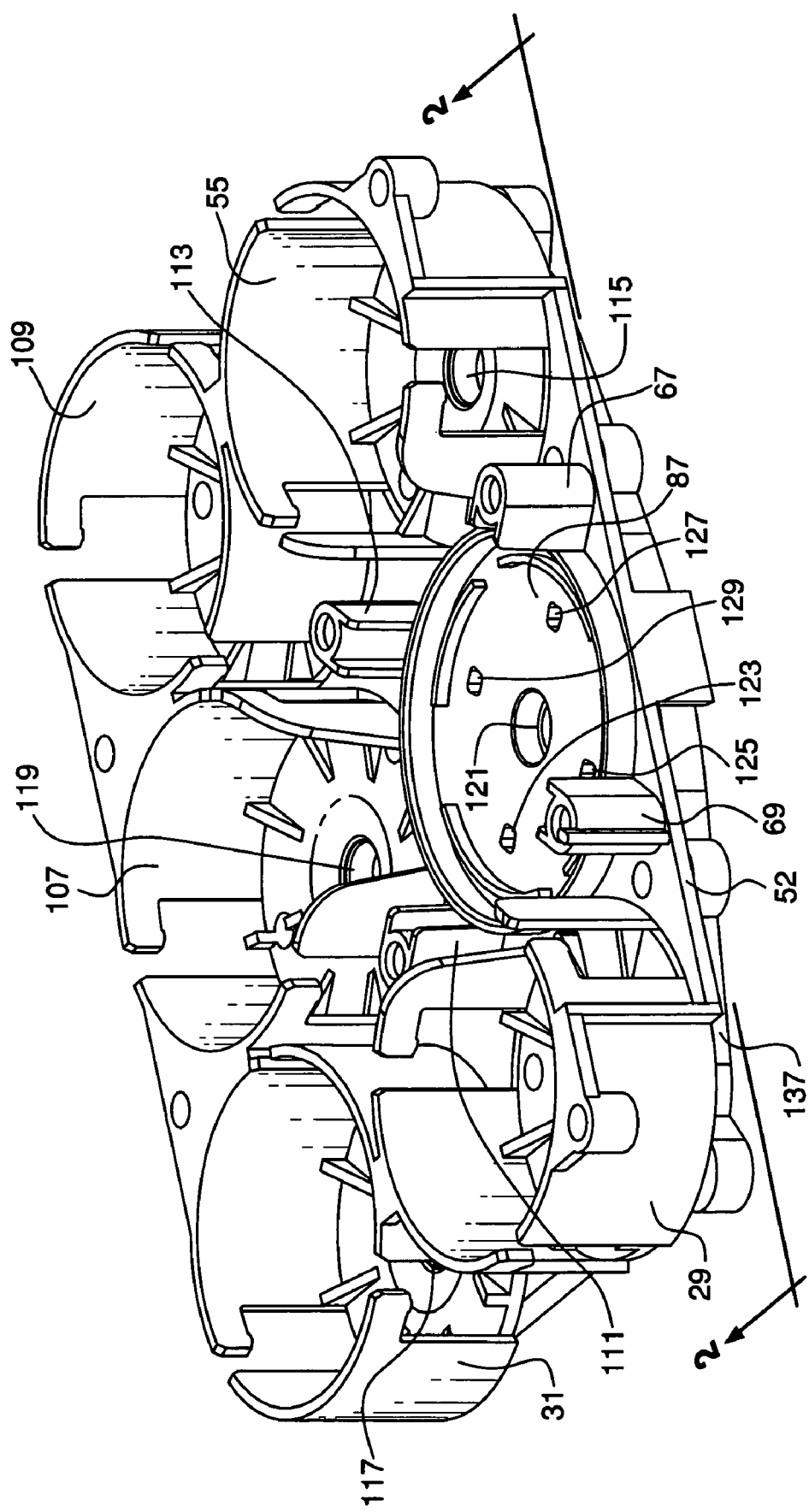
FIG. 7 is a view of the base assembly of FIGS. 5 and 6.

FIG. 7 shows the base assembly without the columns and rotary valve to illustrate the construction of the assembly. The three collars 29, 31, and 55 were described in FIGS. 4-7; the other collars not previously described are collars 107 and 109. All collars are connected directly to bottom member 52 wherein the collars and the bottom member may be fabricated separately and joined by an adhesive or welding. Alternatively, the collars and bottom member may be fabricated as a single piece. The combined collars and bottom member may be described as a molded platform. In one embodiment, the collars and bottom member are made of a plastic or polymeric material. The three retaining notches in each collar are all clearly visible. Mounts 67, 69, 111, and 113 are adapted for mounting rotary valve 65, typically by bolts (not shown) passing through the center of the mounts and engaging nuts located at the bottom of base 137.

Within each of the collars is a centrally-located port in bottom member 52, three of which can be seen as column product ports 115 and 117 within collars 55 and 31, respectively, and as product gas storage column inlet port 119 within collar 107. Identical centrally-located column product ports (not visible) are located within collars 29 and 109. Product stator 87 has centrally-located stator port 121 (also described as a product gas outlet port) and peripheral stator ports 123, 125, 127, and 129. These ports are adjacent the upper surface of bottom member 52 and may extend into bottom member 52. As described later, passages may be built into bottom member 52 to connect stator port 121 with gas storage column inlet port 119 and also to connect peripheral stator port 123 with column product port 117, peripheral stator port 125 with the column product port (not visible) within collar 29, peripheral stator port 127 with column product port 115, and peripheral stator port 129 with the column product port (not visible) within collar 109. Product stator 87 preferably is located adjacent all five collars so that none of the five passages within bottom member 52 cross and so that the five passages may be essentially co-planar.

Figure 8:
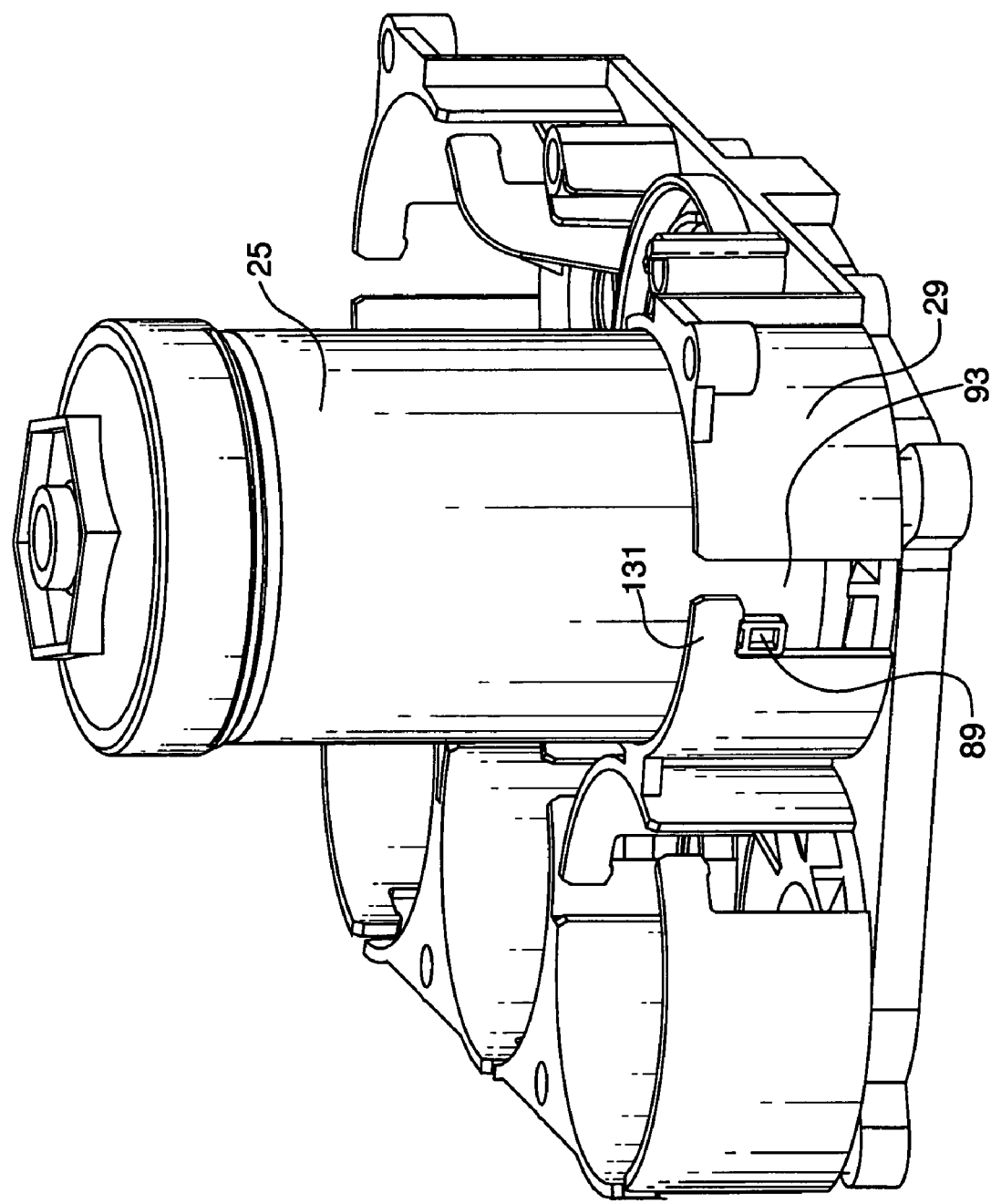
FIG. 8 is a view of the base assembly of FIG. 7 showing an adsorbent column locked into the base.

FIG. 8 further illustrates the engaging and disengaging locking system of the embodiment shown in FIGS. 3-6. In this illustration, boss 89 on adsorbent column 25 is retained in retaining notch 93 by tab 131 that is formed in collar 29 by the specific shape of retaining notch 93. Adsorbent column 25 can be removed from collar 29 by rotating the column counterclockwise (for example, by approximately 17 degrees) and lifting the column vertically, thereby allowing boss 89 to pass through the open portion at the top of retaining notch 93. Installation is effected by reversing these steps.

Figure 9:
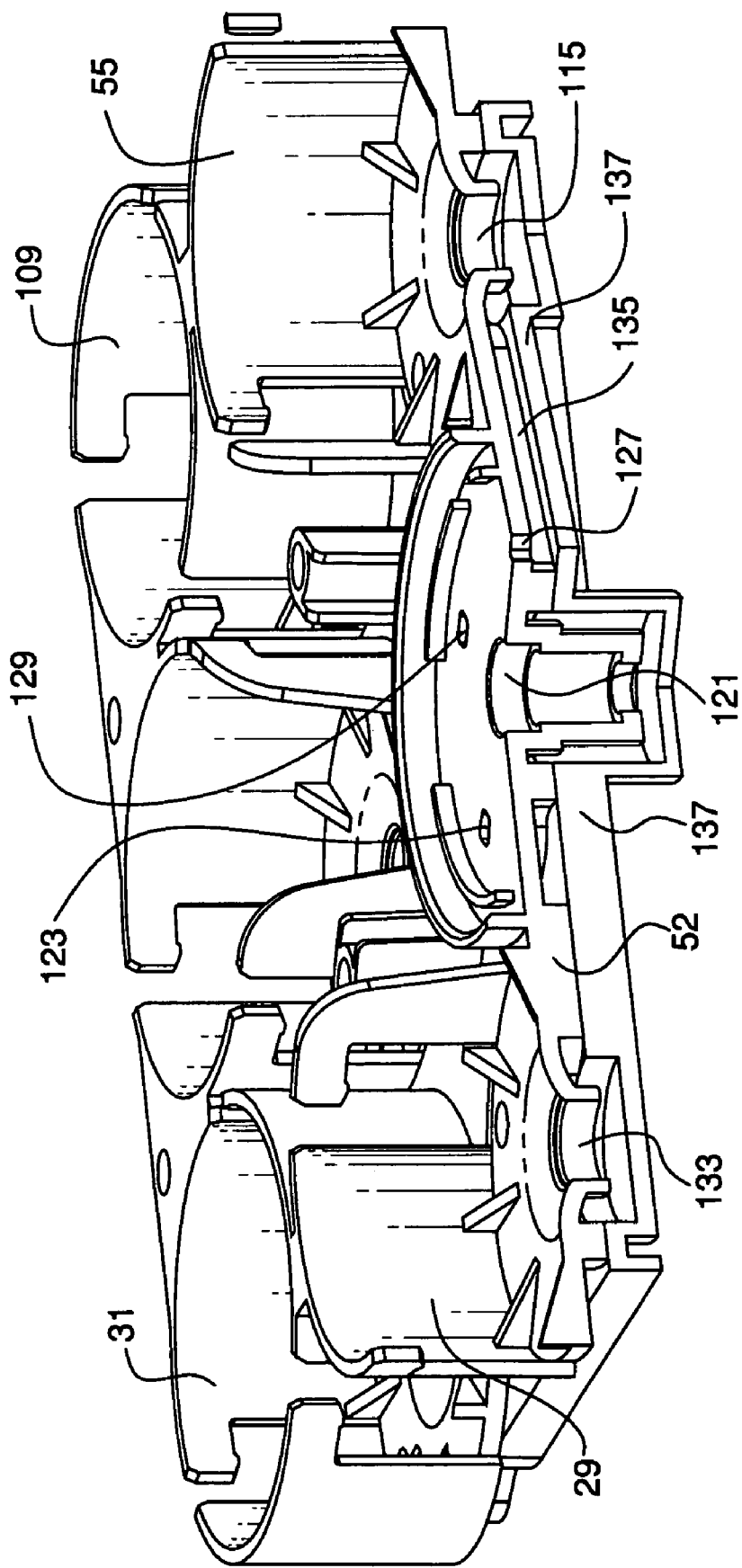
FIG. 9 is a sectional view of the base assembly of FIG. 7.

The base assembly is further illustrated by the cross-sectional view of FIG. 9, which is a section taken along an axis formed approximately by the centers of column product port 115, stator port 121 (also described as a product gas outlet port) of FIG. 7, and column product port 133. The sectional view shows column product port 115 in collar 55, column product port 133 in collar 29, and stator port 121. Peripheral stator port 127 is connected and placed in flow communication with column product port 115 by passage 135. This passage may be formed as a channel within bottom member 52 wherein the channel is closed by joining the upper surface of base 137 to the lower surface of bottom member 52, thereby forming the passage. Alternatively, the channel could be formed in base 137. In another alternative, passage 135 may be formed by groups of partial channels, one group in base 137 and the other group as a mirror image in bottom member 52. In any of these three alternatives, bottom member 52 and base 137 may be defined as first and second submembers that are joined at an interface as shown to form the bottom portion of the base assembly.

Peripheral stator port 123 is connected and placed in flow communication with the column product port (not visible) within collar 31 by a passage (not visible) similar to passage 135. Peripheral stator port 129 is connected and placed in flow communication with the column product port (not visible) within collar 109 by a passage (not visible) similar to passage 135.

Figure 10:
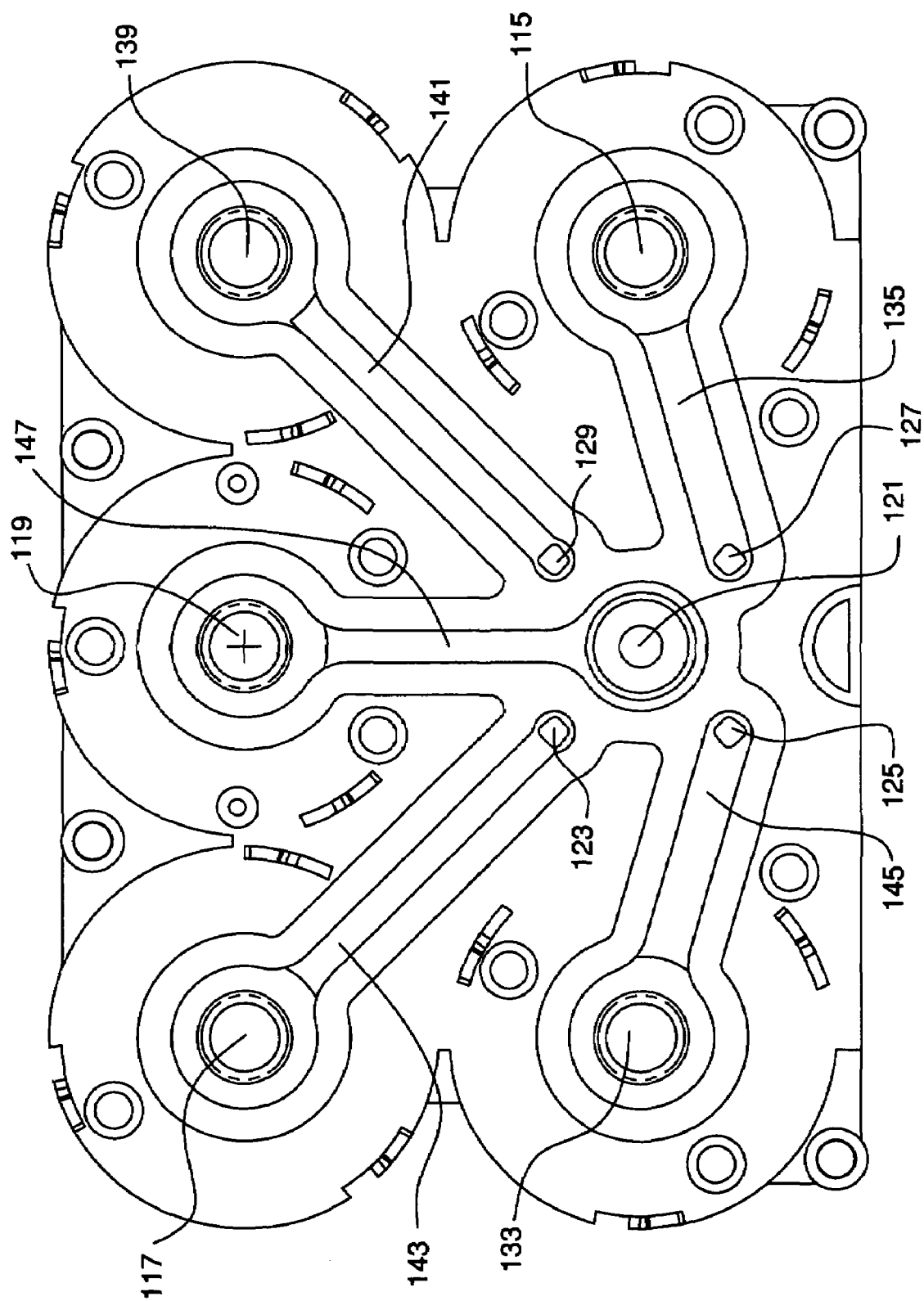
FIG. 10 is a sectional view of the base assembly of FIG. 7 showing passages therein for connecting the rotary valve with the product ends of the adsorber columns and the inlet end of the product storage tank.

The ports and the passages connecting the ports in the base assembly are shown in FIG. 10, which is section 2-2 of FIG. 7. The section shows column product ports 115, 117, 133, and 139; stator port 121; and peripheral stator ports 123, 125, 127, and 129. Passage 135 connects column product port 115 with peripheral stator port 127, passage 141 connects column product port 139 with peripheral stator port 129, passage 143 connects column product port 117 with peripheral stator port 123, and passage 145 connects column product port 133 with peripheral stator port 125. Passage 147 connects stator port 121 with product gas storage column inlet port 119.

A one-way check valve (not shown) may be installed in stator port 121 to ensure that oxygen product gas flows only in one direction from adsorbent columns 27, 53, 25, and 61, through the rotary valve, through passage 147, and into product gas storage column 63 via inlet port 119. Alternatively, if desired, the check valve can be installed in product gas storage column inlet port 119. The check valve thus is adapted to prevent backflow of oxygen product gas from product gas storage column 63 into the PSA system.

The dimensions of passages 135, 141, 143, and 145 in FIG. 10 may be selected such that the dead volumes between the product end of each adsorbent column and the product end of the rotary valve are essentially equal in order to balance the operation of the columns during the adsorption cycle. Likewise, the dimensions of lines 71, 73, 75, and 77 may be selected such that the dead volumes between the feed end of each adsorbent column and the feed end of the rotary valve are essentially equal in order to balance the operation of the columns during the adsorption cycle.

Figure 11:
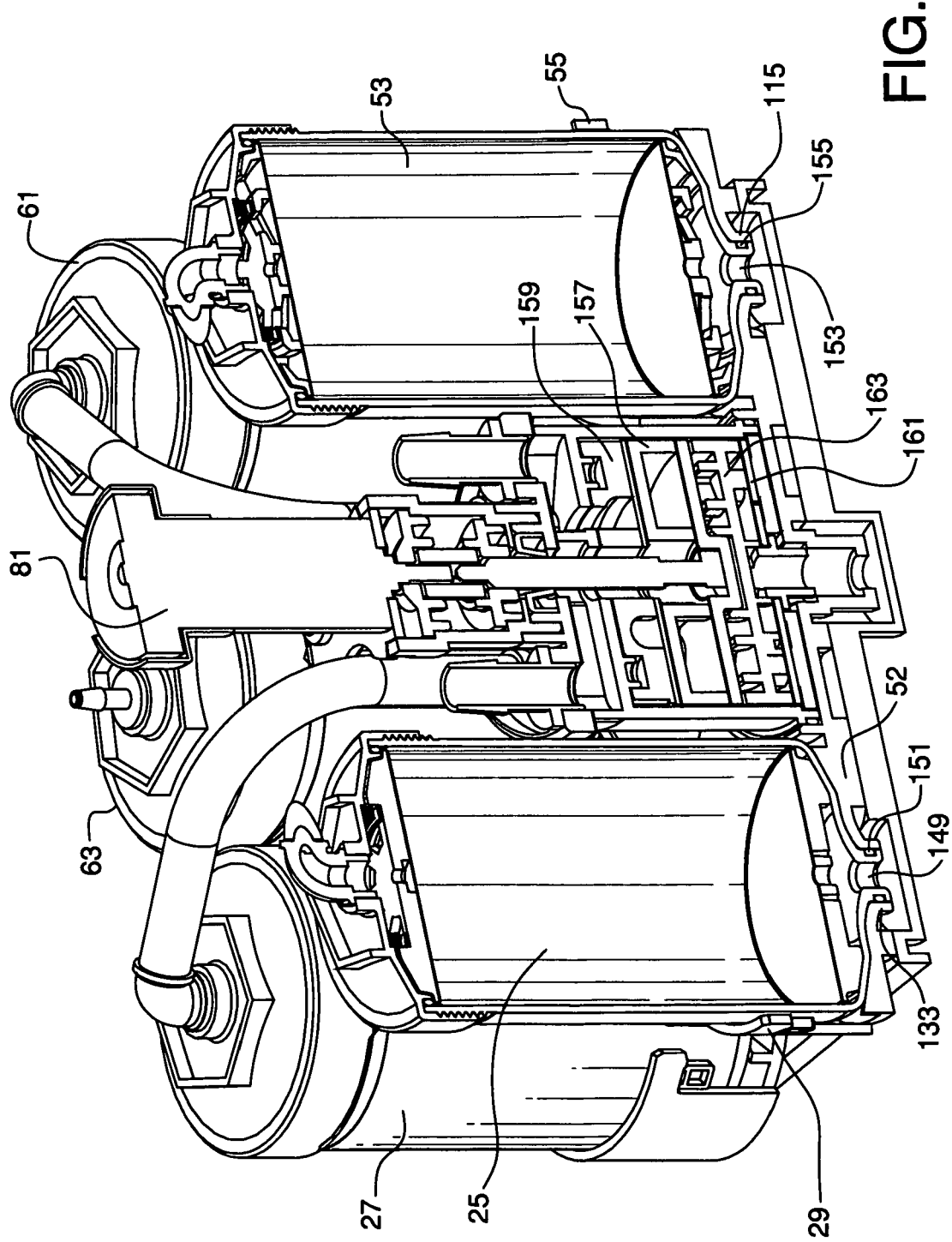
FIG. 11 is a sectional view of FIG. 5 showing taken through two adsorber columns and the rotary valve mounted in the base assembly.

The interior regions of the adsorbent columns and rotary valve are shown in FIG. 11, which is section 4-4 of FIG. 5. Adsorbent column 25 is removably mounted in collar 29 as previously described. The bottom end of the column is fitted with tube 149 having compliant sealing element 151 (for example, an O-ring) located in a circumferential groove around the outer circumference of the tube. Tube 149 with compliant sealing element 151 is adapted to be sealably and removably inserted into column product port 133 located in bottom member 52 of the molded platform. In like manner, adsorbent column 53 is removably mounted in collar 55 as previously described. The bottom end of the column is fitted with tube 153 having compliant sealing element 155, (for example, an O-ring) located in a circumferential groove around the outer circumference of the tube. Tube 153 with compliant sealing element 155 is adapted to be sealably and removably inserted into column product port 115 located in bottom member 52 of the molded platform. Adsorbent columns 27 and 61 likewise are sealably and removably inserted into column product ports 117 and 139, respectively (not visible).

Column 63, which is used for product gas storage, similarly is fitted with a tube having a compliant sealing element, for example, an O-ring, located in a circumferential groove around the outer circumference of the tube. The tube serves as a product gas inlet and has a compliant sealing element similar to compliant sealing element 155 that is adapted to be sealably and removably inserted into gas storage column inlet port 119 (not visible) located in bottom member 52 of the molded platform.

Any of the five columns (adsorbent columns 27, 53, 25, and 61 and gas product storage column 63) thus can be sealably and removably inserted into the appropriate gas storage column inlet ports located in bottom member 52 of the base assembly.

The rotary valve used in this embodiment comprises two rotors and two stators, one rotor-stator set for directing gas flow at the feed ends of the adsorbent columns and the other for directing gas flow at the product ends of the adsorbent columns. In this embodiment, the adsorbent columns described above are oriented such that the bottom ends are the product ends and the top ends are the feed ends. The function of the rotor-stator set serving the feed ends of the columns is to direct compressed air from the feed pump sequentially to each column for the feed/make product step of the process cycle and to connect each column sequentially with the vacuum pump to withdraw waste gas from each column during the purge and evacuation steps of the process cycle. The function of the rotor-stator set serving the product ends of the columns is to connect each adsorbent column sequentially with the inlet of the gas product storage tank during the feed/make product step of the cycle, to connect pairs of columns sequentially to allow gas transfer during the pressure equalization step, to connect pairs of columns sequentially to allow gas transfer during the purge/provide purge step, and to connect each column sequentially with the product gas outlet that leads to the product storage column during the product gas pressurization step.

Various types of two-rotor rotary valves for use in pressure swing adsorption systems are known in the art, and any of these may be adapted for use in embodiments of the invention described above. One two-rotor valve having utility in these embodiments is described in United States published application number 2007/0028791, which is incorporated herein by reference. Single-rotor rotary valves for use in pressure swing adsorption systems also are known in the art and may be adapted for use in these embodiments.

The valve shown in the sectional view of FIG. 11 uses the upper rotor-stator set for directing gas flow at the feed ends, i.e., the upper ends, of adsorbent columns 27, 53, 25, and 61. The lower rotor-stator set is used for directing gas flow between the product ends, i.e., the lower ends, of the adsorbent columns and between the adsorbent columns and gas product storage column 63.

Upper or feed stator 159 has ports in flow communication with the upper or feed ends of adsorbent columns 27, 53, 25, and 61, a port in flow communication with the outlet of cooling coil 35 (FIG. 4) connected to feed air compressor 17 (FIG. 4), and a port in flow communication with vacuum outlet 105 (FIG. 6) that connects to vacuum pump 21 (FIG. 4). The ends of these ports are located in a flat, smooth face of upper or feed stator 159. Feed rotor 157 has a flat, smooth rotor face in sealable and rotatable contact with the face of feed stator 159 and has ports adapted to register sequentially with selected ports in the face of feed stator 159 as the face of feed rotor 157 rotates on the face of feed stator 159. Feed rotor 157 has internal passages that connect selected ports on the rotor face so that, as feed rotor 157 rotates, the feed ends of adsorbent columns 27, 25, 53, and 61 (or columns 61, 53, 25, and 27 if the rotors rotate in the opposite direction) are placed sequentially in selected flow communication with feed air compressor 17 and vacuum pump 21 according to the specific pressure swing adsorption cycle used in the process operation.

Lower or product stator 161 has ports in flow communication with the lower or product ends of adsorbent columns 27, 53, 25, and 61, and a port in flow communication with the inlet of product gas storage column 63. The ends of these ports are located in a flat, smooth face of product stator 161. Product rotor 163 has a flat, smooth rotor face in sealable and rotatable contact with the face of product stator 161 and has ports adapted to register sequentially with selected ports in the face of product stator 161 as the face of product rotor 163 rotates on the face of product stator 161. Product rotor 163 has internal passages that connect selected ports on that stator face so that, as product rotor 163 rotates, the product ends of adsorbent columns 27, 25, 53, and 61 (or columns 61, 53, 25, and 27 if the rotors rotate in the opposite direction) are placed sequentially in selected flow communication with the inlet of product gas storage column 63 according to the specific pressure swing adsorption cycle used in the process operation. Product rotor 163 also has internal passages that connect pairs of selected ports on the rotor face so that, as product rotor 163 rotates, the product ends of selected pairs of adsorbent columns are placed sequentially in flow communication according to the specific pressure swing adsorption cycle used in the process operation.

Figure 12:
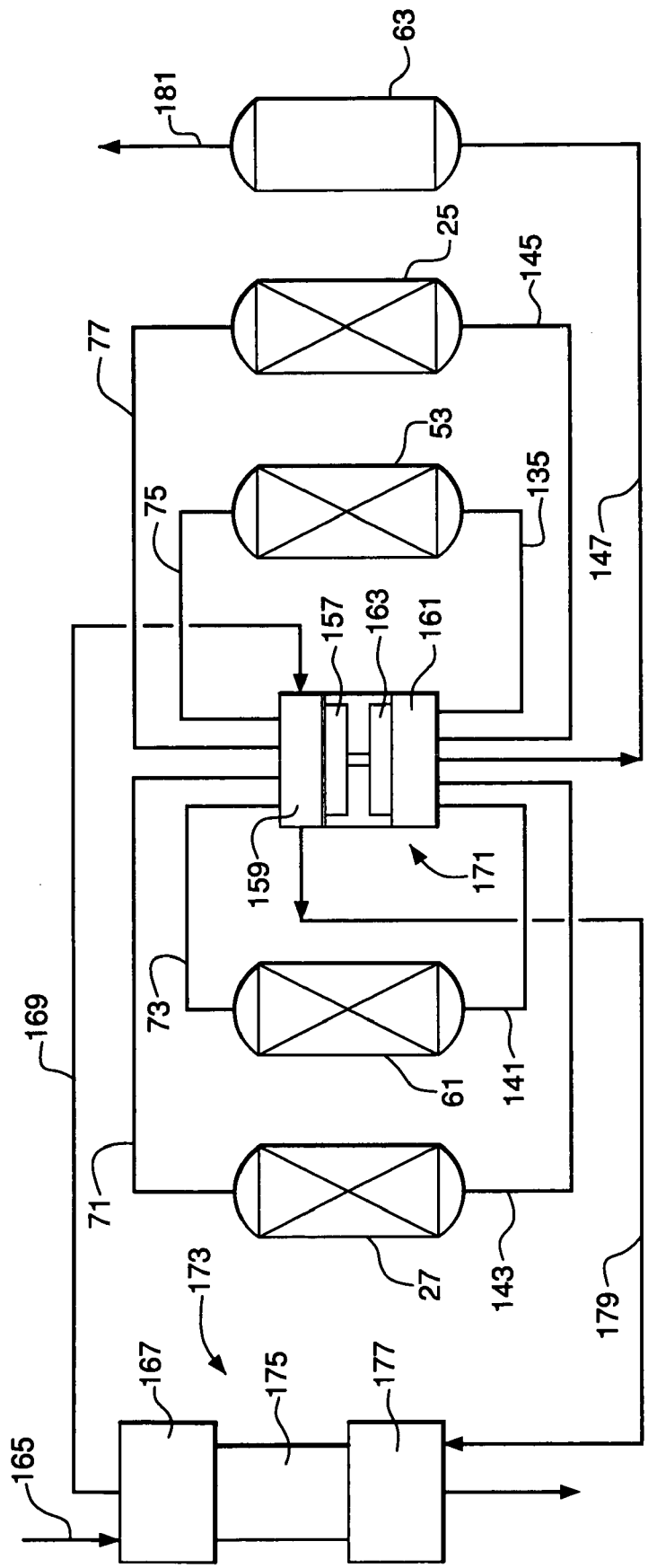
FIG. 12 is a schematic flowsheet of a pressure swing adsorption process using the oxygen concentrator of FIGS. 1-11.

The medical oxygen concentrator described above may be operated in any desired four-bed pressure swing adsorption (PSA) cycle. An exemplary schematic flowsheet is shown in FIG. 12 for a pressure/vacuum swing adsorption (PVSA) process using four adsorbent beds and a single product gas storage tank. In the process, ambient air via inlet line 165 is compressed to a pressure of 18 to 26 psia in feed pump 167 and flows via line 169 to the feed inlet of rotary valve 171. Feed pump 167 may be any type of gas compressor known in the art; in this embodiment, the pump is a scroll-type compressor or pump that is part of integrated pump system 173 comprising central drive motor 175, feed pump 167, and vacuum pump 177 (these may correspond, for example, to drive motor 19, feed pump 17, and vacuum pump 21 of FIG. 4).

Rotary valve 171 comprises feed stator 159, feed rotor 157, product stator 161, and product rotor 163. Rotors 157 and 163 are rotated by a drive motor (not shown) that corresponds to drive motor 81 of FIGS. 6 and 11. Feed stator 159 has four feed ports connected to lines 71, 73, 75, and 77 (see also FIG. 6) which in turn are connected to adsorbent columns 27, 61, 53, and 25 (see also FIG. 6), respectively. Another port on feed stator 159 is connected via line 179 to vacuum pump 177. Feed rotor 157 has a flat, smooth rotor face in sealable and rotatable contact with the face of feed stator 159 and has ports adapted to register sequentially with selected ports in the face of feed stator 159 as the face of feed rotor 157 rotates on the face of feed stator 159. Feed rotor 157 has internal passages that connect selected ports on the rotor face so that, as feed rotor 157 rotates, the feed ends of adsorbent columns 27, 25, 53, and 61 (or columns 61, 53, 25, and 27) are placed sequentially in selected flow communication with feed air compressor 167 and vacuum pump 177 according to the specific pressure swing adsorption cycle used in the process operation. The internal cavity of rotary valve 171 may be maintained at sub-atmospheric pressure to protect the product ends of the adsorbent columns from contamination by water in ambient air in the event of leakage across the stator-rotor interfaces.

Product stator 161 has four product ports that are connected via lines 135, 141, 143, and 145 to adsorbent columns 53, 61, 27, and 25, respectively. These lines correspond to channels 135, 141, 143, and 145 in FIG. 10. Product stator 161 also has a port that is connected via line 147 to product gas storage column 63. Line 147 corresponds to passage 147 of FIG. 10. Oxygen product line 181 leads directly to oxygen product outlet 5 or to an optional built-in conserver (not shown).

An exemplary pressure swing adsorption process using the system of FIG. 12 utilizes an eight-step repeating cycle outlined below for a given adsorbent column:

(1) a feed/make product step wherein the pressurized feed air is introduced into a feed end of the bed while the oxygen-enriched product gas is withdrawn from a product end of the bed;

(2) a feed/make product/provide repressurization step wherein the pressurized feed air is introduced into a feed end of the bed while an oxygen-enriched product gas is withdrawn from a product end of the bed, and wherein a portion of the product gas is used for pressurizing another bed undergoing its product repressurization step;

(3) a depressurization step in which the bed is depressurized by withdrawing gas therefrom, wherein at least a portion of the gas withdrawn therefrom is transferred to another bed undergoing a repressurization step;

(4) a provide purge step in which the bed is further depressurized by withdrawing gas therefrom, wherein at least a portion of the gas withdrawn therefrom is transferred to another bed undergoing a purge step;

(5) an evacuation step in which gas is withdrawn from the feed end of the bed until the bed reaches a minimum sub-atmospheric bed pressure;

(6) a purge step in which the bed is purged by introducing purge gas into the product end of the bed while continuing to evacuate the bed, wherein the purge gas is provided from another bed undergoing step (4);

(7) a repressurization step in which pressurization gas is introduced into the product end of the bed, wherein the pressurization gas is provided from another bed undergoing step (3); and (8) a product repressurization step in which product gas from another bed or the gas product storage tank is introduced into the product end of the bed.

Product repressurization step (8) may be followed by a feed repressurization step wherein feed gas is introduced into the feed end of the bed for a period prior to the initiation of product withdrawal in feed/make product step (1).

Each of adsorbent columns 27, 61, 53, and 25 in turn undergoes these steps, and the relationship among the steps in the columns is summarized in the cycle chart given below in Table 1.

TABLE 1

4-Bed PVSA Cycle Chart

| Column | Step Number | | | | | | | |
|---|---|---|---|---|---|---|---|---|
| 27 | 1 | 2 | 3 | 4 | 5 | 6 | 7 | 8 |
| 61 | 7 | 8 | 1 | 2 | 3 | 4 | 5 | 6 |
| 53 | 5 | 6 | 7 | 8 | 1 | 2 | 3 | 4 |
| 25 | 3 | 4 | 5 | 6 | 7 | 8 | 1 | 2 |

Rotary valve 171 controls the directions of sequential gas flow as follows: feed gas flow to each column and product gas from each column in turn during steps 1 and 2; product gas flow from a column making product or the product gas storage cylinder 63 to each column during product repressurization step 8; repressurization gas flow in turn from column 27 to column 53, column 61 to 25, column 53 to column 27, and column 25 to column 61 during steps 3 and 7; provide purge gas flow in turn from column 27 to column 25, column 61 to column 27, column 53 to column 61, and column 25 to column 53 during steps 4 and 6; evacuation waste gas flow from each column in turn during step 5; and purge waste gas flow from each column in turn during step 6. The elapsed time for each step may be set at any desired duration; an exemplary elapsed time of 1.0 second may be selected for each step, thereby giving an exemplary total repeating cycle time of 8.0 seconds.

While the four adsorbent column system described above utilizes a "six-pack" orientation in which the base assembly of FIG. 7 supports the four adsorbent beds, the product gas storage column, and the rotary valve in two symmetrical rows of three positions, other orientations are possible as long as the rotary valve is adjacent each of the adsorbent columns. For example, a pentagonal orientation is possible in which the rotary valve is surrounded symmetrically by the four adsorbent columns and product storage column. In another alternative, the two parallel rows of three positions may be offset rather than directly opposite as in FIG. 5 such that the rotary valve is directly adjacent and equidistant from the adsorbent columns, and the product gas storage column is located on the opposite side of two adsorbent columns such that the adsorbent columns are between the product gas storage column and the rotary valve. The passages in the base of the support assembly can be modified from the orientation of FIG. 10 for this alternative.

While the system and process described above utilize four adsorbent beds and the PSA cycle of Table 1, other numbers of beds and other PSA cycles may be used if desired. For example, the base assembly of FIG. 7 could be modified to support two adsorbent columns, one product gas storage column, and the rotary valve in a "four-pack" configuration. In another example, the "six-pack" orientation of FIG. 5 may be used with three adsorbent columns and two product gas storage columns. In another example, a system having five adsorbent columns and one product gas storage column may be used wherein the adsorbent columns and product gas storage column are located in a hexagonal pattern around the rotary valve. In yet another example, a system with seven adsorbent columns and one product gas storage column may be designed such that the columns and rotary valve positions are oriented in three parallel rows of three (i.e., a "nine-pack") with the rotary valve in the center. Other alternative geometries, numbers of adsorbent columns, and numbers of product gas storage columns can be envisioned by a skilled designer of these systems. Any of these alternatives may utilize the embodiment of the invention described above wherein the columns are mounted in a base assembly having integral internal passages that connect the columns with the ports of the rotary valve.

The oxygen concentrator described above may be operated in any orientation. Support base or bottom platform 9 (FIGS. 1 and 2) defines a planar surface, and the concentrator is adapted to operate when the planar surface is oriented horizontally or at any angle from a horizontal plane. In most applications, base 9 (FIGS. 1 and 2) is placed on a floor or other horizontal surface. However, in other applications, the concentrator may be operated while resting on its front or back, for example, under the seat of an airplane, train, bus, or ferry.

The concentrator may be operated in any of several power supply modes. In one mode, the concentrator is operated on AC power while connected to an AC power outlet, and the batteries are recharged as necessary during this operation. In another mode, the concentrator is operated on AC power while the batteries are detached for external charging or maintenance. In a third mode, the concentrator is operated on battery power alone. In a fourth mode, the concentrator is operated on DC power while connected to a DC power outlet in a car or other means of transportation or alternatively while connected to a DC storage battery during an AC power outage. When operating on externally-supplied DC power, the concentrator batteries may be attached to or detached from the concentrator.

The invention claimed is:

1. A portable medical oxygen concentrator comprising
 (a) an air separation system adapted to recover oxygen from air, wherein the air separation system comprises
  (1) two or more adsorbent columns, each column including a feed end, a product end, and adsorbent material for effecting gas separation by selective adsorption;
  (2) a pump assembly comprising a feed pump having a compressed air outlet and a vacuum pump having a gas inlet;

(3) an oxygen product outlet;
(4) a rotary valve having a first plurality of ports adapted to place the compressed air outlet of the feed pump in flow communication sequentially with the feed end of each adsorbent column and to place the gas inlet of the vacuum pump in flow communication sequentially with the feed end of each adsorbent column and having a second plurality of ports adapted to place the oxygen product outlet in flow communication sequentially with the product end of each adsorbent column and to place the product end of each adsorbent column in flow communication sequentially with the product end of another adsorbent column; and
(5) a base assembly adapted to support the two or more adsorbent columns and the rotary valve;
(b) a bottom platform and a shell having an outer wall, wherein the shell is detachably connected to the bottom platform, wherein the base assembly is attached to the bottom platform, wherein the shell and bottom platform define an enclosed volume when the shell is connected to the bottom platform, and wherein the air separation system is disposed in the enclosed volume; and
(c) one or more rechargeable batteries detachably connected to the outer wall of the shell and adapted to provide power to drive the air separation system.

2. The portable medical oxygen concentrator of claim 1 wherein the feed pump and the vacuum pump are scroll-type compressors, each being driven by a common drive motor, and wherein the drive motor is disposed coaxially between the feed pump and the vacuum pump.

3. The portable medical oxygen concentrator of claim 1 wherein the shell has a bottom end adjacent the bottom platform and an upper end opposite the bottom end, wherein the enclosed volume includes a dividing wall disposed between the base assembly and the pump assembly, and wherein the dividing wall extends upward from the bottom platform to a point intermediate the bottom platform and the upper end of the shell.

4. A portable medical oxygen concentrator comprising
(a) an air separation system adapted to recover oxygen from air that includes
(1) two or more adsorbent columns, each column including a feed end, a product end, and adsorbent material for effecting gas separation by selective adsorption;
(2) a pump assembly comprising a feed pump having a compressed air outlet and a vacuum pump having a gas inlet;
(3) an oxygen product outlet;
(4) a rotary valve having a first plurality of ports adapted to place the compressed air outlet of the feed pump in flow communication sequentially with the feed end of each adsorbent column and to place the gas inlet of the vacuum pump in flow communication sequentially with the feed end of each adsorbent column and having a second plurality of ports adapted to place the oxygen product outlet in flow communication sequentially with the product end of each adsorbent column and to place the product end of each adsorbent column in flow communication sequentially with the product end of another adsorbent column; and
(5) a base assembly adapted to support the two or more adsorbent columns and the rotary valve; and
(b) a bottom platform and a shell having an outer wall, wherein the base assembly and the pump assembly are mounted on the bottom platform, wherein the shell is detachably connected to the bottom platform, and wherein the air separation system is disposed in an enclosed volume formed by the shell and bottom platform when the shell is connected to the bottom platform.

5. The portable medical oxygen concentrator of claim 4 comprising one or more rechargeable batteries detachably connected to the outer wall of the shell and adapted to provide power to drive the feed pump and the vacuum pump.

6. The portable medical oxygen concentrator of claim 5 comprising a control system and a conserver, wherein the rechargeable batteries are adapted to provide power to the control system and conserver.

7. The portable medical oxygen concentrator of claim 5 wherein the bottom platform defines a planar surface and wherein the concentrator is adapted to operate when the planar surface is oriented horizontally or at any angle from a horizontal plane.

8. The portable medical oxygen concentrator of claim 5 wherein the shell has an inlet grille, an outlet grille, and a fan disposed in the enclosed volume and adapted to draw ambient air into the enclosed volume and discharge heated air from the enclosed volume.

9. The portable medical oxygen concentrator of claim 8 comprising a cooling coil attached to the compressed air outlet of the feed pump and adapted to cool hot compressed air from the feed pump, wherein the fan is adapted to pass ambient air over the cooling coil and the feed pump.

10. The portable medical oxygen concentrator of claim 9 wherein the shell has a bottom end adjacent the bottom platform and an upper end opposite the bottom end, wherein the enclosed volume includes a dividing wall disposed between the base assembly and the pump assembly, and wherein the dividing wall extends upward from the bottom platform to a point intermediate the bottom platform and the upper end of the shell.

11. An adsorptive gas separation system comprising
(a) two or more cylindrical columns, wherein each column includes a feed end, a feed inlet at the feed end, a product end, and a product outlet at the product end, and wherein at least two of the cylindrical columns are adsorbent columns containing adsorbent material for effecting gas separation by selective adsorption;
(b) a pump assembly comprising a feed pump having a compressed gas outlet and a vacuum pump having a gas inlet;
(c) a product gas outlet;
(d) a rotary valve having a first plurality of ports adapted to place the compressed gas outlet of the feed pump in flow communication sequentially with the feed end of each adsorbent column and to place the gas inlet of the vacuum pump in flow communication sequentially with the feed end of each adsorbent column and having a second plurality of ports adapted to place the product gas outlet in flow communication sequentially with the product end of each adsorbent column and to place the product end of each adsorbent column in flow communication sequentially with the product end of another adsorbent column;
(e) a base assembly upon which the adsorbent columns and the rotary valve are mounted; and
(f) a support platform upon which the base assembly and the pump assembly are mounted.

12. The adsorptive gas separation system of claim 11 comprising a product gas storage tank in flow communication with the product gas outlet and in sequential flow communication with the product outlet at the product end of each adsorbent column.

13. The adsorptive gas separation system of claim 12 wherein the product gas storage tank is one of the two or more cylindrical columns, contains none of the adsorbent material, and is mounted on the base assembly.

14. The adsorptive gas separation system of claim 12 wherein the product gas storage tank contains a different adsorbent material than the adsorbent material in the adsorbent columns, wherein the different adsorbent material is adapted to increase the effective product tank storage capacity.

15. The adsorptive gas separation system of claim 11 wherein the base assembly comprises a molded platform comprising a bottom member having a first surface and a second surface generally parallel to the first surface, two or more cylindrical collars attached to the first surface of the bottom member and adapted to detachably receive and support the respective product ends of the two or more cylindrical adsorbent columns, and a ported stator plate attached to the first surface of the bottom member, and wherein the ported stator plate is part of the rotary valve and includes the second plurality of ports adapted to place the product gas outlet in flow communication sequentially with the product end of each adsorbent column and to place the product end of each adsorbent column in flow communication sequentially with the product end of another adsorbent column.

16. The adsorptive gas separation system of claim 15 wherein the ported stator plate has a central stator port and two or more peripheral stator ports adjacent the first surface of the bottom member; wherein a column product port is disposed in the bottom member of the molded platform within each of the two or more cylindrical collars, each column product port extending from the first surface of the bottom member to a point intermediate the first surface and the second surface of the bottom member; wherein each column product port and each cylindrical adsorbent column is adapted such that the product outlet of a cylindrical adsorbent column can be sealably and removably connected to a column product port; and wherein each peripheral stator port is connected to a respective column product port by a passage disposed in the bottom member of the base assembly.

17. The adsorptive gas separation system of claim 12 wherein the cylindrical adsorbent columns and/or the base assembly comprise plastic or polymeric material.

18. The adsorptive gas separation system of claim 15 wherein the bottom member and the two or more cylindrical collars are formed from a single piece of molded polymeric or plastic material.

19. The adsorptive gas separation system of claim 16 comprising a product gas storage tank in flow communication with the product gas outlet and in flow communication via the central stator port with the product outlet at the product end of each adsorbent column, wherein the product gas storage tank is one of the two or more cylindrical columns, contains none of the adsorbent material, and is detachably supported in one of the cylindrical collars on the base assembly; wherein the feed inlet of the product gas storage tank is adapted to be sealably and removably connected to a column product port disposed in the bottom member of the molded platform within the cylindrical collar; and wherein the column product port is connected to the central stator port by a passage disposed in the bottom member of the base assembly.

20. A base assembly for an adsorptive gas separation system comprising
 (a) a molded platform comprising a bottom member having a first surface and a second surface generally parallel to the first surface;
 (b) two or more cylindrical collars attached to the first surface of the bottom member and adapted to detachably receive and support respective ends of two or more cylindrical columns; and
 (c) a ported stator plate attached to the first surface of the bottom member, wherein the ported stator plate is part of a rotary valve adapted to direct gas flow in the operation of the adsorptive gas separation system, and wherein the ported stator plate has a central stator port and two or more peripheral stator ports adjacent the first surface of the bottom member;
wherein a column product port is disposed in the bottom member of the molded platform within each of the two or more cylindrical collars, each column product port extending from the first surface of the bottom member to a point intermediate the first surface and the second surface of the bottom member, each column product port adapted to be sealably and removably connected to a cylindrical column, and wherein each peripheral stator port is connected to a respective column product port by a passage disposed in the bottom member of the base assembly.

21. The base assembly of claim 20 comprising two or more cylindrical columns, each column having an interior and a tube at one end in flow communication with the interior, wherein the tube has a compliant sealing element disposed around an outer circumference thereof, and wherein the tube with the compliant sealing element is adapted to be sealably and removably inserted into a column product port disposed in the bottom member of the molded platform.

22. The base assembly of claim 21 wherein the compliant sealing element is an O-ring disposed in a circumferential groove in an outer surface of the tube and wherein the O-ring is sized such that the tube and O-ring can be sealably and removably inserted into a column product port.

23. The base assembly of claim 22 wherein each column is adapted to be locked into a cylindrical collar while the tube and O-ring are sealably inserted into the column product port of the cylindrical collar and is adapted to be unlocked from the cylindrical collar while the tube and O-ring are removed from the column product port.

24. The base assembly of claim 21 wherein at least two of the two or more cylindrical columns are adsorbent columns containing adsorbent material for effecting gas separation by selective adsorption.

25. The base assembly of claim 21 wherein at least one of the two or more cylindrical columns is adapted to be used as a product gas storage tank.

26. The base assembly of claim 25 wherein the product gas storage tank contains an adsorbent material adapted to increase the effective product tank storage capacity.

27. The base assembly of claim 20 wherein the bottom member comprises
 (1) a first sub-member including the first surface, the two or more cylindrical collars attached to the first surface, a first intermediate surface generally parallel with the first surface, and open channels that form portions of the passages connecting each peripheral stator port to a respective column product port; and
 (2) a second sub-member including the second surface and a second intermediate surface generally parallel with the second surface;
wherein the first and second intermediate surfaces are joined such that the first open channels in the first sub-member are covered by the second intermediate surface, thereby forming the passages disposed in the bottom member of the base assembly that connect each peripheral stator port to a respective column product port.

28. The base assembly of claim 20 wherein the bottom member comprises
(1) a first sub-member including the first surface, the two or more cylindrical collars attached to the first surface, a first intermediate surface generally parallel with the first surface, and first open channels that form first portions of the passages connecting each peripheral stator port to a respective column product port; and
(2) a second sub-member including the second surface, a second intermediate surface generally parallel with the second surface, and second open channels that form second portions of the passages connecting each peripheral stator port to a respective column product port;
wherein the first and second intermediate surfaces are joined such that the first open channels in the first sub-member are congruent with the second open channels of the second sub-member, thereby forming the passages disposed in the bottom member of the base assembly that connect each peripheral stator port to a respective column product port.

29. The base assembly of claim 21 wherein any of the molded platform, the two or more cylindrical collars, and the two or more cylindrical adsorbent columns comprise plastic or polymeric material.

30. A portable medical oxygen concentrator comprising
(a) an air separation system adapted to recover oxygen from air that includes
(1) four or more cylindrical columns, wherein each column includes a feed end, a feed inlet at the feed end, a product end, and a product outlet at the product end, and wherein at least four of the cylindrical columns are adsorbent columns containing adsorbent material for effecting air separation by selective adsorption;
(2) a pump assembly comprising a feed pump having a compressed air outlet and a vacuum pump having a gas inlet;
(3) an oxygen product outlet;
(4) a rotary valve having a first plurality of ports adapted to place the compressed air outlet of the feed pump in flow communication sequentially with the feed end of each adsorbent column and to place the gas inlet of the vacuum pump in flow communication sequentially with the feed end of each adsorbent column, a product gas outlet port, and a second plurality of ports adapted to place the product gas outlet port in flow communication sequentially with the product end of each adsorbent column and to place the product end of each adsorbent column in flow communication sequentially with the product end of another adsorbent column; and
(5) a base assembly adapted to support the at least four adsorbent columns and the rotary valve;
(b) a bottom platform and a shell having an outer wall, wherein the base assembly and the pump assembly are mounted on the bottom platform, wherein the shell is detachably connected to the bottom platform, and wherein the air separation system is enclosed by the shell and bottom platform when the shell is connected to the bottom platform; and
(c) one or more rechargeable batteries detachably connected to the outer wall of the shell and adapted to provide power to drive the feed pump, the vacuum pump, and the rotary valve.

31. The portable medical oxygen concentrator of claim 30 comprising a product gas storage tank in continuous flow communication with the product gas outlet port and in sequential flow communication with the product outlet at the product end of each adsorbent column.

32. The portable medical oxygen concentrator of claim 31 comprising a check valve having an inlet and an outlet, piping connecting the product gas outlet port with the inlet of the check valve, and piping connecting the outlet of the check valve with the product gas storage tank.

33. The portable medical oxygen concentrator of claim 31 wherein the product gas storage tank is one of the cylindrical columns and is mounted on the base assembly.

34. The base assembly of claim 33 wherein the product gas storage tank contains a different adsorbent material than the adsorbent material in the adsorbent columns, wherein the different adsorbent material is adapted to increase the effective product tank storage capacity.

35. The portable medical oxygen concentrator of claim 33 comprising a conserver adapted to deliver oxygen product from the product gas storage tank to the oxygen product outlet, wherein the conserver is adapted to deliver the oxygen during a patient's inhalation period and to deliver no oxygen during the patient's exhalation period.

36. The portable medical oxygen concentrator of claim 33 comprising four adsorbent columns and the product gas storage tank, wherein the base assembly supports the four adsorbent columns, the gas storage tank, and the rotary valve.

37. The portable medical oxygen concentrator of claim 36 wherein the base assembly comprises
(a) a molded platform comprising a bottom member having a first surface and a second surface generally parallel to the first surface;
(b) five cylindrical collars attached to the first surface of the bottom member and adapted to detachably receive and support respective product ends of the four cylindrical adsorbent columns and the product gas storage tank;
(c) a ported stator plate attached to the first surface of the bottom member and disposed adjacent at least two of the five cylindrical collars; wherein the ported stator plate is part of the rotary valve adapted to direct gas flow in the operation of the adsorptive gas separation system; and wherein the ported stator plate has a central stator port and four peripheral stator ports adjacent the first surface of the bottom member;
wherein within each of the five cylindrical collars there is disposed a column product port in the bottom member of the molded platform, each column product port extending from the first surface of the bottom member to a point intermediate the first surface and the second surface of the bottom member, each column product port adapted to be sealably and removably connected to a product outlet of a cylindrical column; wherein each peripheral stator port is connected to a column product port associated with a respective adsorbent column by a passage disposed in the bottom member of the base assembly; and wherein the central stator port is connected to the column product port associated with the product gas storage tank by a passage disposed in the bottom member of the base assembly.

38. The portable medical oxygen concentrator of claim 37 wherein the bottom member comprises
(1) a first sub-member including the first surface, the five cylindrical collars attached to the first surface, a first intermediate surface generally parallel with the first surface, and first open channels that form first portions of the passages connecting each peripheral stator port to a respective column product port and the passage connecting central stator port to the column product port associated with the product gas storage tank; and
(2) a second sub-member including the second surface and a second intermediate surface generally parallel with the second surface;

wherein the first and second intermediate surfaces are joined such that the first open channels in the first sub-member are covered by the second intermediate surface, thereby forming the passages disposed in the bottom member of the base assembly that connect each peripheral stator port to a respective column product port and the passage that connects the central stator port to the column product port associated with the product gas storage tank.

39. The portable medical oxygen concentrator of claim 37 wherein the five cylindrical collars are arranged such that a first collar, a second collar, and a third collar are placed at equidistant locations along a first axis and a fourth collar and a fifth collar are placed on a second axis generally parallel to the first axis, wherein the fourth collar is adjacent the first collar, the fifth collar is adjacent the third collar, the ported stator plate is adjacent the second collar and is on the second axis between the fourth collar and the fifth collar.

40. The portable medical oxygen concentrator of claim 39 wherein the cylindrical column that serves as the product gas storage tank is mounted in the second collar and the cylindrical columns that contain the adsorbent material are mounted in the first, third, fourth and fifth collars.

41. The portable medical oxygen concentrator of claim 30 wherein the bottom platform comprises a generally flat bottom portion having a periphery, an upper surface, and a lower surface, a continuous vertical wall segment having an upper end and a lower end, wherein the lower end is attached to the periphery of the flat bottom portion and the upper end has a horizontal lip attached thereto, wherein the base assembly and the pump assembly are mounted on the upper surface, and wherein the lower surface is adapted to rest on a floor or other external surface.

* * * * *